United States Patent [19]

Mori

[11] Patent Number: 4,680,988
[45] Date of Patent: Jul. 21, 1987

[54] CONTROL FOR SHOCK-FREE SHIFT IN AN AUTOMATIC TRANSMISSION

[75] Inventor: Yasushi Mori, Yokohama, Japan

[73] Assignee: Nissan Motor Co., Ltd., Yokohama, Japan

[21] Appl. No.: 800,394

[22] Filed: Nov. 21, 1985

[30] Foreign Application Priority Data

Nov. 22, 1984 [JP] Japan ................... 59-245879
Dec. 5, 1984 [JP] Japan ................... 59-255813
Dec. 5, 1984 [JP] Japan ................... 59-255814

[51] Int. Cl.$^4$ ........................................... B60K 41/18
[52] U.S. Cl. ....................................... 74/866; 74/858; 74/859; 364/424.1
[58] Field of Search ................. 74/866, 858, 859, 860; 364/424.1; 192/103 C, 3.31, 3.29

[56] References Cited

U.S. PATENT DOCUMENTS

| | | | |
|---|---|---|---|
| 3,327,553 | 6/1967 | Peras | 74/858 |
| 3,446,097 | 5/1969 | Schmidt et al. | 74/858 |
| 3,545,307 | 12/1970 | Bildat | 74/858 |
| 3,719,096 | 3/1973 | Sprague et al. | 74/866 X |
| 3,898,893 | 8/1975 | Hashimoto et al. | 74/859 |
| 3,942,393 | 3/1976 | Forster et al. | 74/866 |
| 4,172,505 | 10/1979 | Rabns et al. | 192/103 C X |
| 4,200,007 | 4/1980 | Espenschied et al. | 74/859 |
| 4,224,842 | 9/1980 | Rabns et al. | 74/866 |
| 4,262,557 | 4/1981 | Grob et al. | 74/861 |
| 4,431,095 | 2/1984 | Suga | 192/3.31 |
| 4,457,411 | 7/1984 | Hiramatsu | 192/3.31 X |
| 4,485,443 | 11/1984 | Knodler et al. | 74/866 X |
| 4,493,228 | 1/1985 | Vulsovich et al. | 74/858 |
| 4,535,412 | 8/1985 | Cederquist | 364/424.1 X |

FOREIGN PATENT DOCUMENTS

| | | |
|---|---|---|
| 56-127856 | 10/1981 | Japan. |
| 57-120752 | 7/1982 | Japan. |
| 58-77138 | 5/1983 | Japan. |
| 58-207556 | 12/1983 | Japan. |
| 225241 | 9/1970 | U.S.S.R. ............ 74/866 |

Primary Examiner—Allan D. Herrmann
Assistant Examiner—D. Wright
Attorney, Agent, or Firm—Schwartz, Jeffery, Schwaab, Mack, Blumenthal & Evans

[57] ABSTRACT

According to the present invention, there is provided a device for controlling a motor vehicle installed with an engine and an automatic transmission during a shift in gear positon in the automatic transmission, the automatic transmission having an input shaft drivingly connected to the engine and an output shaft. In the device, an actual value in a speed ratio is accurately detected and thus monitored during a transient period involving a shift in gear position taking place in the automatic transmission, and a closed loop control is effected based on the actual speed ratio detected.

14 Claims, 27 Drawing Figures

CONTROL FOR SHOCK-FREE SHIFT IN AN AUTOMATIC TRANSMISSION

BACKGROUND OF THE INVENTION

The present invention relates to a device for controlling a shift in gear position in an automatic transmission of a motor vehicle.

Commonly, an automatic transmission has a plurality of gear positions, each providing a speed ratio peculiar to the particular gear positions, between a transmission input shaft and a transmission output shaft. Under the control of a control system, a command for one of the plurality of gear positions is made and the one gear position is established so as to produce an output torque sufficiently large enough to keep a motor vehile installed with the automatic transmission running. If there is a change in the running state of the motor vehicle, a change in gear position command, i.e., a shift command, takes place in the control system. After a delay (i.e., a response delay) after an instant when the change in command has taken place, a plurality of friction elements are put into action to initiate a shift. There is another delay (i.e., a shift delay) after the initiation of the shift until the completion thereof. During this transient period when the shift is being effected, a ratio of the revolution speed of the input shaft to that of the output shaft undergoes a change from a speed ratio peculiar to the old gear position to a speed ratio peculiar to a new gear position. If this change during this transient period is not smooth. substantial shocks are generated. However, since the shift is controlled in an open loop manner, it is next to impossible to always make the speed ratio change in a predetermined schedule tailored to the shift. Thus, it is desired to control this shift in a closed loop manner (i.e., feedback control of the shift). In order to realize this feedback control, an excellent detector for detecting or measuring a speed ratio of the revolution speed of the input shaft to that of the output shaft is needed.

Referring to a motor vehicle installed with an automatic transmission having an input shaft drivingly connected to an engine via a torque converter, a discussion will proceed hereinafter why substantial shocks are produced during a shift from a low gear position to a high gear position with an engine accelerator pedal kept depressed. One typical example is illustrated in FIG. 18 where there occurred at the instant $t_1$ a change in command from a second gear position to a third gear position. Referring to FIG. 18, at the subsequent instant $t_2$ after a response delay $\Delta T_1$ from the instant $t_1$, friction elements are put into action to initiate a shift, and the action of the friction elements is terminated to complete the shift at the subsequent instant $t_3$ after a shift delay $\Delta T_2$ from the instant $t_2$. The speed ratio is subject to a change from a speed ratio $R_L$ (1.4, for example) peculiar to the second gear position to a speed ratio $R_H$ (1.0, for example) peculiar to a third gear position as illustrated by a fully drawn line during the time interval $\Delta T_2$ where the action of the friction elements progresses. The revolution speed of the transmission input shaft, i.e., an input shaft revolution speed $N_i$, also decreases in response to the change in the speed ratio during this time interval $\Delta T_2$ beginning with $t_2$ and ending with $t_3$ until it becomes equal to the revolution speed of the transmission output shaft, i.e., an output shaft revolution speed $N_o$. With the same opening degree of an engine throttle, an input torque $T_i$ fed to the automatic transmission, which is generally equal in amount to an output torque of the engine $T_e$, varies in inverse proportion to the above mentioned variation of the input shaft revolution speed $N_i$ during the time interval $\Delta T_2$. Theoretically, since it results from multiplying the input torque $T_i$ with the speed ratio, an output torque $T_o$ of the transmission stays substantially unchanged during the shift. However, the inertia of the engine works to resist the tendency of the input shaft decreasing its speed during this time interval $\Delta T_2$, applying a torque $T_m$ due to inertia to the transmission input shaft, causing an increase as shown by $T_o'$ in the transmission output torque $T_o$ during the shift, causing generation of substantial shocks.

Japanese patent application laid-open No. 58-207556 discloses a device for alleviating substantial shocks during a shift by causing a drop, in the engine output, from the normal level during the shift so as to suppress the above mentioned increase in the transmission output shaft. More particularly, according to this known device, the amount of delay in spark timing is increased during the shift so as to cause a drop in the engine output torque, thus suppressing the increase in the transmission output shaft. The initiation and termination of the above mentioned spark timing are brought into agreement with the initiation and termination of each shift in gear position taking place in the automatic transmission under the control of a timer circuit.

Japanese patent application laid-open No. 58-77138 discloses a method of alleviating shocks taking place during a shift in an automatic transmission. According to this known method, the output torque of an engine is subject to a temporal variation (i.e., a temporal drop/increase) during a shift. The temporal variation in the engine output torque is initiated at a predetermined timing with the instant when a change in command for gear position takes place.

Referring to a motor vehicle installed with a so-called lock-up type automatic transmission having an input shaft drivingly connected to an engine via a lock-up torque converter, i.e., a torque converter with a lock-up clutch, a discussion will proceed hereinafter how the lock-up clutch is released during a shift so as to alleviate shocks which would otherwise take place should the lock-up clutch be kept engaged during the shift.

Japanese patent application laid-open No. 56-127856 which has a U.S. counterpart, now U.S. Pat. No. 4,431,095 issued on Suga on Feb. 14, 1984 discloses a device for controlling a shift in a lock-up type automatic transmission. The operation of this known device is illustrated in FIG. 25 wherein a change in command from a second gear position to a third gear position occurred at the instant $t_1$. Describing the operation of this known device referring to FIG. 25, a lock-up signal is subject to a change from ON level to OFF level at the subsequent instant $t_2$ after a delay $\Delta T_1$ from the instant $t_1$. The OFF level of the lock-up signal causes the lock-up torque converter to assume its converter state after releasing its lock-up clutch. The OFF level of the lock-up signal is maintained during a time interval $\Delta T_2$ beginning with the instant $t_2$. After this time interval $\Delta T_2$, the lock-up signal resumes ON level. In response to this temporal stay of the lock-up signal in OFF level, the lock-up torque converter starts effecting a shift from lock-up state to converter state immediately after the instant $t_2$, but it does not resume lock-up state immediately after the change in the lock-up signal from OFF level to OFF level. The resumption to lock-up state is considerably delayed and starts at the instant $t_5$ as illustrated. This characteristic is attributed to the construction of a lock-up control hydraulic circuit. At the subsequent instant $t_3$ after a response delay $\Delta T_3$ from the instant $t_1$, friction elements are put into action to initiate a shift in gear position, and the shift is completed at the instant $t_4$ after a shift delay $\Delta T_4$. The speed ratio changes from a speed ratio $R_2$ peculiar to the second gear position down to a speed ratio $R_3$ peculiar to the third gear position. Since the response delay $\Delta T_3$ is subject to a change owing to manufacturing variation from one product to another and/or oil temperature, the delay $\Delta T_1$ is set as being shorter than the response delay $\Delta T_3$ so as to allow a variation in the response delay, thus leaving a time interval from the instant $t_2$ to $t_3$ where the lock-up torque converter works as a torque converter even though the shift is not yet initiated. During this time interval from $t_2$ to $t_3$, the engine speed $N_E$ sharply increases up to a level $N_{E1}$ that is considerably higher than a level $N_{E2}$ which the engine speed would reach if the time interval from $t_2$ to $t_3$ were substantially zero ($t_2 = t_3$). Considering a torque due to inertia that result from multiplying the inertia of the engine with the engine speed, the torque due to inertia increases considerably during a time interval from the instant $t_3$ to $t_4$, i.e., during the shift, causing substantial shocks to take place.

From the preceding description, it will be recognized that the known devices are not satisfactory in alleviating shocks during a shift because they control the automatic transmission in an open loop manner during the shift.

The present invention aims at controlling a shift in an automatic transmission in a closed loop manner in order to alleviate shocks which would occur during the shift in an automatic transmission.

The present invention aims also at detecting or measuring an actual value in a speed ratio of a revolution speed of a transmission input shaft to that of a transmission output shaft during a shift in gear position in a transmission.

Japanese patent application laid-open No. 57-120752 discloses a method of detecting a gear position established in a motor vehicle installed with a transmission. According to this known method, a pulse train signal generated by a rotational angle sensor of a distributor, and a pulse train signal generated by a vehicle speed sensor for a speed meter are used. The pulse train signal of the rotational angle sensor has a frequency variable in proportion to the revolution speed of a transmission input shaft, and the pulse train signal has a frequency variable in proportion to the revolution speed of a transmission output shaft. These pulse train signals are processed to find the revolution speed of the transmission input shaft and that of the transmission output shaft, and then the former is divided by the latter to give a speed ratio of input to output. In finding the revolution speed of each of the shafts, pulses generated during a unit length of time are counted and the result is generated as the revolution speed. In order to detect the revolution speed with a good accuracy, the unit length of time has to be sufficiently long. Besides, since the number of pulses counted during the unit length of time are considerably small at low vehicle speed, the precision drops considerably. Thus, this known method is not suitable for detecting an actual value in the speed ratio during a shift in gear position in a transmission.

SUMMARY OF THE INVENTION

According to the present invention, there is provided a device for controlling a motor vehicle installed with an engine and an automatic transmission during a shift in gear position in the automatic transmission, the automatic transmission having an input shaft drivingly connected to the engine and an output shaft. The device comprises means for detecting an actual value in a speed ratio of the revolution speed of the input shaft to that of the output shaft during a transient period involving a shift in gear position taking place in the automatic transmission and generating an actual speed ratio indicative signal; and means for effecting a closed loop control of the shift based on said actual speed ratio indicative signal during the transient period.

According to the present invention, there is provided a detector for detecting a speed ratio of an input shaft to an output shaft. The detector comprises:

first sensor means for generating a first pulse train signal having a frequency variable in proportion to a revolution speed of the input shaft;

second sensor means for generating a second pulse train signal having a frequency variable in proportion to a revolution speed of the output shaft;

means for finding a first period of said first pulse train signal and generating a first period indicative signal indicative of said first period found;

means for finding a second period of said second pulse train signal and generating a second period indicative signal indicative of said second period found; and means for calculating a ratio of said first period indicative signal to said second period indicative signal and generating said ratio as a speed ratio established in the transmission.

DESCRIPTION OF EMBODIMENTS

Referring to FIGS. 1 to 5, one embodiment according to the present invention is described.

Figure 1:
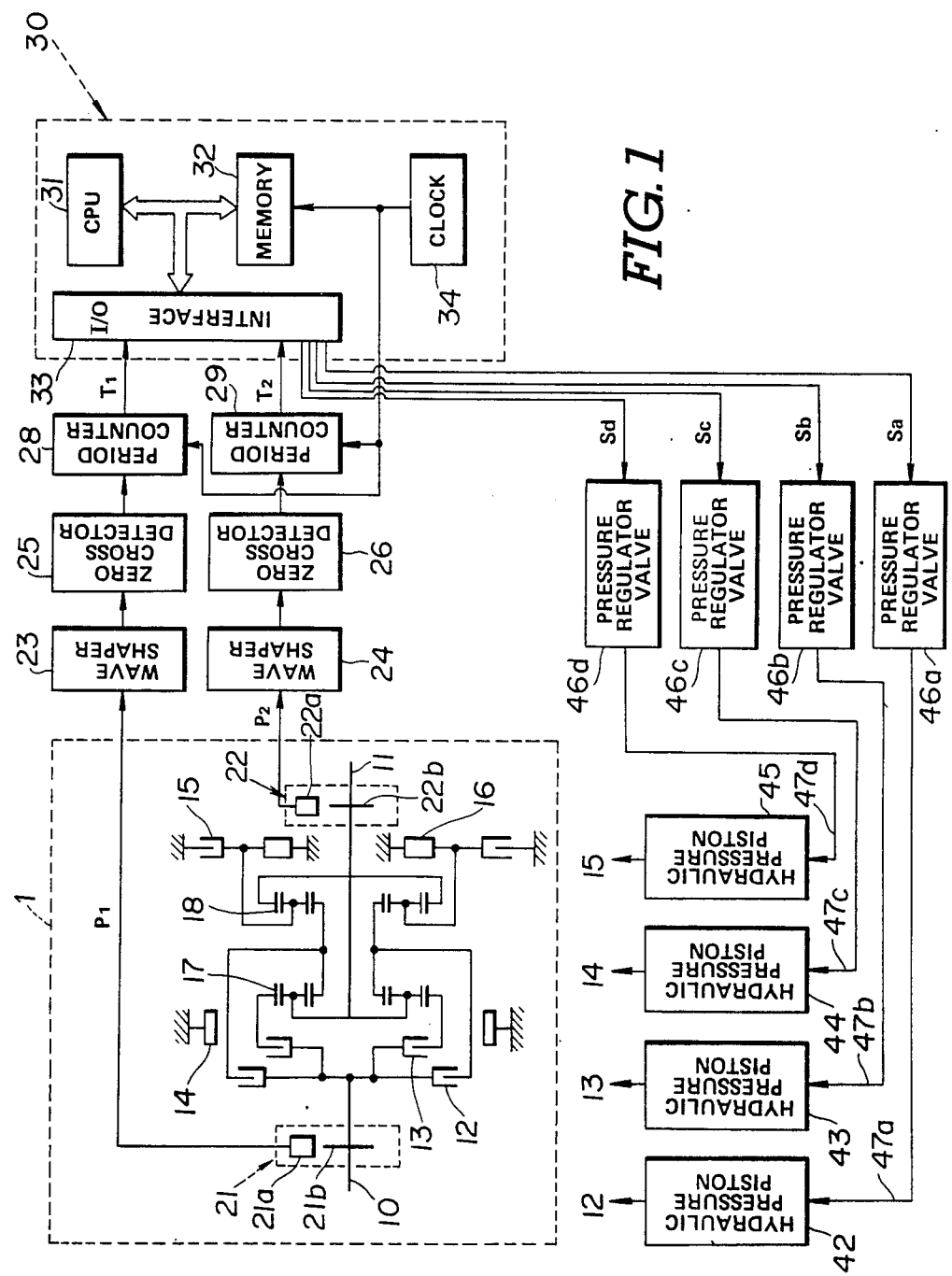
FIG. 1 is a block diagram showing an automatic transmission for a motor vehicle incorporating a first embodiment according to the present invention.

Referring to FIG. 1, there is schematically shown an automatic transmission 1 installed in a motor vehicle having an engine, not shown. The automatic transmission has an input shaft 10 drivingly connected via a torque converter to the engine in a known manner, an output shaft drivingly connected with driving wheels, not shown, of the motor vehicle in a known manner, and a change-speed mechanism which is shiftable to three forward gear positions and one reverse gear position. The change-speed mechanism comprises two groups of planetary gear sets 17, 18, and a plurality of friction elements that include a front clutch 12, a rear clutch 13, a band brake 14, a low and reverse brake 15, and a one-way clutch 16.

Among all, the friction elements 12-15 are selectively put into action (engaged/released), thus changing a speed ratio of the revolution speed of the input shaft 10 that of the output shaft 11. The friction elements 12-15 are engaged or released in each of drive ranges as shown in Table.

TABLE

| | FRONT CLUTCH | REAR CLUTCH | BAND BRAKE | LOW & REV. BRAKE |
|---|---|---|---|---|
| N, P | X | X | X | X |
| R | O | X | X | O |
| $D_1$ | X | O | X | X |
| $D_2$ | X | O | O | X |
| $D_3$ | O | O | X | X |

In the Table:
N: the neutral,
P: the parking range,
R: the reverse range
$D_1$: 1st gear position in the drive range,
$D_2$: 2nd gear position in the drive range,
$D_3$: 3rd gear position in the drive range,
O: the engaged state,
X: the released state.

The friction elements 12-15 are actuated by hydraulic pressure pistons 42-45, respectively, such that each of the friction elements is engaged in response to hydraulic fluid pressure supplied to the corresponding hydraulic pressure piston.

The hydraulic pressures supplied to the above mentioned hydraulic pressure pistons 42-45 are regulated by pressure regulator valves 46a-46d, respectively. These pressure regulator valves are of the same construction like the one as shown in FIG. 2, for example.

Figure 2:
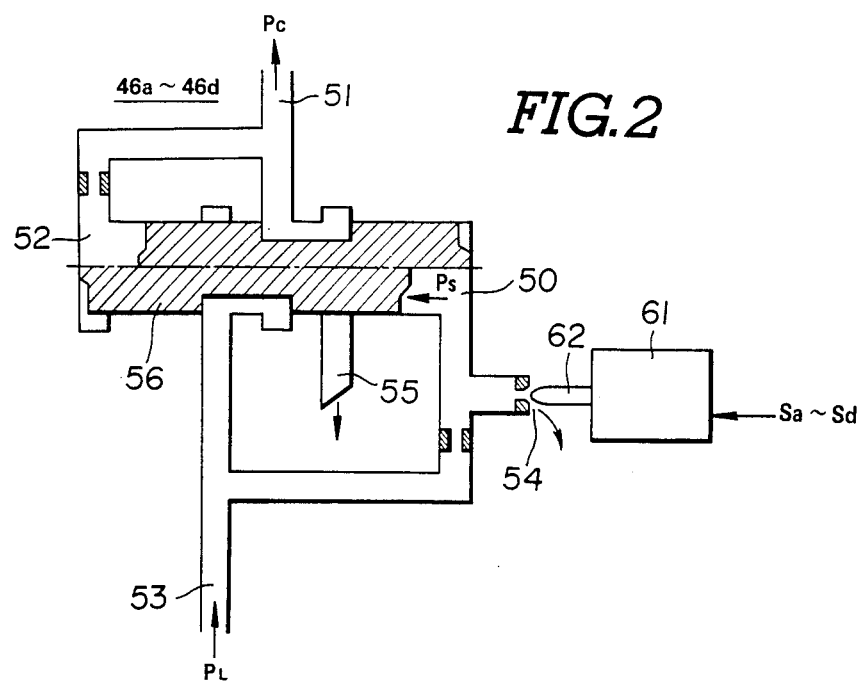
FIG. 2 is a diagrammatic sectional view showing a pressure regulator.

Referring to FIG. 2, an inlet passage 53 is supplied with a hydraulic fluid pressure $P_L$ having a predetermined constant value by a source of hydraulic fluid pressure (not shown). An output hydraulic fluid pressure $P_C$ produced after pressure regulation appears in an outlet passage 51 to be supplied to the corresponding one of the hydraulic pressure piston. The hydraulic fluid pressure $P_C$ is variable in response to a bias pressure $P_S$ that is variable in response to the drainage rate via a drain 54.

The drainage rate via the drain 54 is variable in response to a bias force applied to a needle valve 62, which bias force is adjustable by varying ON-OFF duty ratio of an energization current passing through a solenoid valve 61. That is, when the solenoid valve 61 stays in OFF state (duty ratio $D_{ON}=0$), the drain 54 is fully opened, allowing the pressure $P_S$ to drop to its lowest level, thus allowing a spool 56 to assume a position illustrated by an upper half thereof in FIG. 2 wherein the outflow port 51 is allowed to communicate with a drain 55. This allows the output pressure $P_C$ to assume its lowest level. Under this condition, the corresponding friction element is released.

If duty ratio $D_{ON}$ is increased the drainage rate is decreased in response to the duty ratio $D_{ON}$, thus causing the pressure $P_S$ to increase. In this case, the spool 56 assumes a position where the pressure in the chamber 50 balances with the pressure in a feedback chamber 52, thus causing the output pressure $P_C$ to increase.

The solenoid valves for the regulator valves 46a, 46b, 46c and 46d are supplied with excitation currents, respectively, having duty ratios Sa, Sb, Sc, and Sd which are determined by a control unit 30. The control unit 30 is a microcomputer system that comprises a CPU 31, a memory 32, an I/O interface 33 and a system clock 34.

In order to detect or measure a speed ratio r of the revolution speed of the input shaft 10 to that of the output shaft 11, a detector is provided which includes the control unit 30. It also includes an input shaft revolution speed sensor 21, an output shaft revolution speed sensor 22, wave shapers 23, 24, zero cross detectors 25, 26, and period counters 28, 29. The sensor 21 includes a magnetic pinion 21b attached to the input shaft 10 and a magnetic pick-up 21a arranged adjacent to the magnetic pinion 21. According to this arrangement, the magnetic pick-up 21a generates a pulse train signal $P_1$ having a frequency variable in proportion to the revolution speed of the magnetic pinion 21, i.e., the revolution speed of the input shaft 10.

Similarly, the sensor 22 includes a magnetic pinion 22b attached to the output shaft 11, and a magnetic pick-up 22a. The magnetic pick-up 22a generates a pulse train signal $P_2$ having a frequency variable in proportion to the revolution speed of the output shaft 11.

Figure 3A:
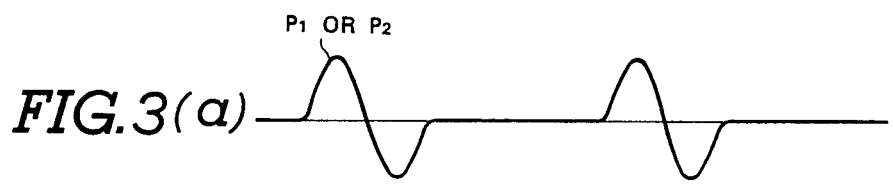
FIGS. 3(a), 3(b) and 3(b) are timing diagrams.
Figure 3B:
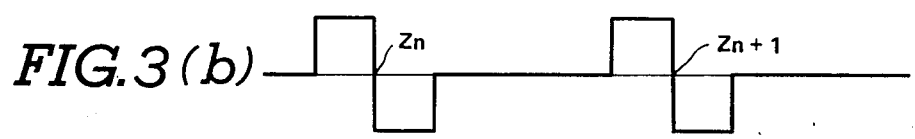
Figure 3C:
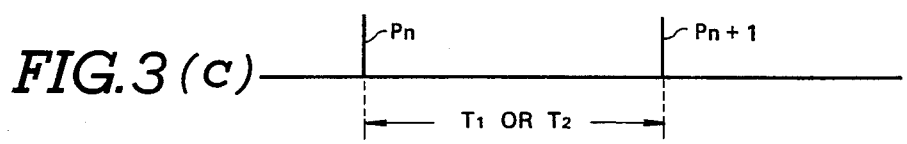

One pulse of each of the above mentioned pulse train signal $P_1$ and $P_2$ is generated whenever each of the teeth of the corresponding one of the magnetic wheels 21b and 22b passes the corresponding one of the magnetic pick-ups 21a and 22a, as shown in FIG. 3(a). The pulse signals $P_1$ and $P_2$ are converted by the wave shapers 23 and 24, respectively, into square-shaped pulses, as shown in FIG. 3(b). At the zero cross detectors 25 and 26, a zero cross point $Z_n$ (n=the integer) of each of said square-shaped pulses is detected, thus causing the generation of a trigger pulse $P_n$ (n=the integer) as shown in FIG. 3(c). Each of the period counters 28 and 29 is provided with a counter that counts the output of a clock 34 mounted within the control unit 30. Whenever it receives a trigger pulse $P_n$, the content of the counter generated as its output to an output register to be stored therein and the counter is reset. Thus, the content of the output register corresponds to the length of time, i.e., a time interval, between the adjacent two trigger pulses $P_n$ and $P_{n+1}$ and this length of time $T_1$ or $T_2$ corresponds to the period of the corresponding pulse train signal $P_1$ or $P_2$. Hereinafter, the reference character $T_1$ is used to denote the period of the pulse train signal $P_1$, and the reference character $T_2$ is used to denote the period of the pulse train signal $P_2$.

Figure 4:
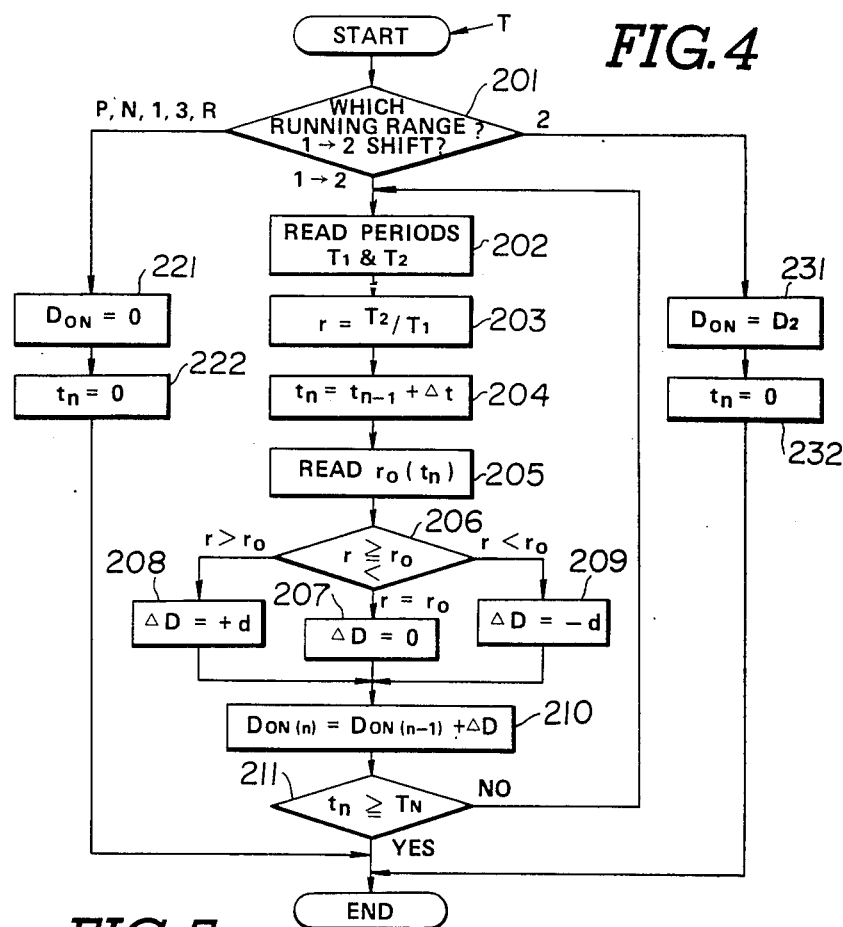
FIG. 4 is a flow chart of the first embodiment.

FIG. 4 is a flow chart showing the sequence of operations executed in the above mentioned control unit 30.

Figure 5:
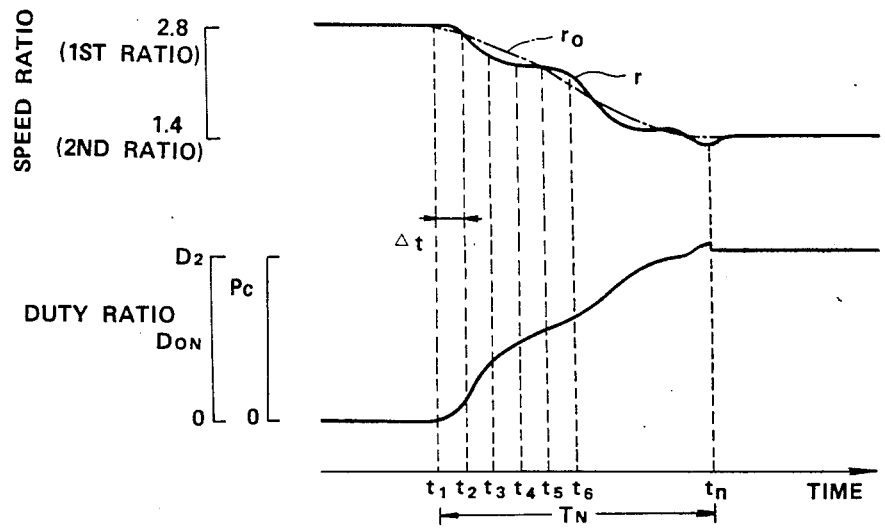
FIG. 5 is a graph illustrating a variation in speed ratio and a variation in duty ratio versus time during a shift.

The series of operations shown in FIG. 5 relates to a control of the band brake 14 of the automatic transmission 1. Although not shown, similar flow charts for the front clutch, rear clutch, and low & reverse brake are stored. These four flow charts are executed consecutively and the execution of each of them is initiated after a predetermined length of time. The series of operations for controlling the band brake, as shown in FIG. 5, is executed after a length of time of T.

First of all, a step 201 is executed where a decision is made of which running range should be selected. This decision making at step 201 involves selecting one running range out of [N, P], [R], [$D_1$], [$D_2$], [$D_3$] based on parameters detected such as, a vehicle speed, a position of a shift lever, and an opening degree of a throttle valve. The operation at step 201 also involves comparing a new running range determined in the present run with an old running range determined in the preceding run, and deciding whether [$D_1$] range determined in the preceding run has changed to [$D_2$] range determined in the present run, i.e., whether a shift from the first to the second gear position (hereinafter abbeviated as a 1-2 shift) is demanded.

When the decision made at the step 201 ends in 1-2 shift, the band brake 14 has to be engaged or applied because the application of the band brake 14 takes place only during a shift from [$D_1$] range to [$D_2$] range, as illustrated in the Table mentioned before.

When the decision made at the step 201 turns out to be an instruction that 1-2 shift is to be initiated speed ratio r is given at steps 202 and 203, and the hydraulic fluid pressure for engaging the band brake 14 is determined at steps 204 to 211.

At the step 202, the period $T_1$ of the pulse train signal $P_1$ stored in the output register within the period counter 28 and the period $T_2$ of the pulse train signal $P_2$ stored in the output register within the period counter 29 are read.

Then, at the step 203, the ratio ($T_2/T_1$) of the above mentioned period $T_2$ to the period $T_1$ is calculated. Since this ratio is equal to the speed ratio of the revolution speed of the input shaft 10 to that of the output shaft 11, $r = T_2/T_1$ is set.

At the subsequent step 204, the time $t_n$ is updated by adding to the old time $t_{n-1}$ given in the preceding run an increase $\Delta t$ deemed to be required for the operations from the step 202 to step 211.

At step 205, a target value in speed ratio $r_0(t_n)$ for the instant $t_n$ is read at the memory 32. The setting at the memory 32 is such that the target value varies as shown by a one-dot chain line curve in FIG. 5 which has been so chosen as to alleviate shocks which takes place during a 1-2 shift. What is intended is to control hydraulic fluid pressure with which the band brake 14 is applied in such a manner as to bring an actual value in speed ratio r into agreement with the target value $r_0$.

At step 206, the actual value r is compared with the target value $r_0$. When r is greater than $r_0$, a step 208 is executed where a predetermined increase $+d$ is placed as a duty ratio variation $\Delta D$. This duty ratio variation $\Delta D$ represents a variation in duty ratio $D_{ON}$ of the excitation current $S_c$ supplied to the solenoid valve of the pressure regulator valve 46c forming the hydraulic pressure circuit for the band brake 14.

When r is equal to $r_0$, a step 207 is executed where 0 (zero) is placed as $\Delta D$, while when r is less than $r_0$, a step 209 is executed when a decrease $-d$ is placed as $\Delta D$.

At a step 210, the duty ratio variation $\Delta D$ is added to an old duty ratio $D_{ON(n-1)}$ that was obtained in the preceding run and the result is placed as a new duty ratio $D_{ON(n)}$. Thereafter, the above mentioned new duty ratio $D_{ON}$ is set as the duty ratio of the excitation current passing through the solenoid valve 61 of the pressure regulator valve 46c.

At a step 211, the time $t_n$ beginning with the instant when 1-2 shift was commanded is compared with a predetermined period $T_N$ to determine whether the time $t_n$ has reached $T_N$. Thus, the series of operations begining with step 202 and ending with step 211 is repeated until $t_n$ exceeds $T_N$.

When, on the other hand, the decision making at the step 201 ends in [N, P], [$D_1$], [$D_3$] or [R], $D_{ON}=0$ is set as the duty ratio of the excitation current $S_c$ because, as apparent from the Table 1, the band brake 14 is to be released.

When the running range to be selected is found to be [$D_2$], $D_{ON}=D_2$ is set as the duty ratio of the excitation current $S_c$. $D_2$ is a predetermined value large enough to render the band brake 14 fully applied.

FIG. 5 is a graph showing a variation in the speed ratio r versus time during a 1-2 shift and also a variation in the duty ratio $D_{ON}$ of the excitation current $S_c$. The variation in the duty ratio $D_{ON}$ represents in hydraulic fluid pressure $P_C$ supplied to the hydraulic fluid pressure piston 44 during the 1-2 shift.

Referring to FIG. 5, since [$D_1$] range is established prior to the instant $t_1$, the duty ratio $D_{ON}$ is equal to 0, (step 221) and thus the band brake 14 is released. Under this condition, the speed ratio is equal to a value (for example, 2.8) peculiar to this [$D_1$] range.

At the instant $t_1$ when a 1-2 shift is demanded after the vehicle speed has increased sufficiently high enough for this shift, the series of operations from the step 202 to step 211 (see FIG. 5) is executed where the comparison of r with $r_0$ is repeated after every predetermined length of time $\Delta t$ so as to increase or decrease the duty ratio $D_{ON}$. As a result, the actual speed ratio value r follows closely the target value $r_0$.

After the predetermined period $T_N$ beginning with the instant $t_1$, the predetermined value $D_2$ is set as the duty ratio $D_{ON}$ (step 231), resulting in the complete application of the band brake 14. Thereafter, the vehicle travels at the speed ratio value (for example, 1.4) peculiar to the [$D_2$] range.

As explained in the preceding description, according to this embodiment, since the setting is made such that the target value $r_0$ gradually decreases during the predetermined period $T_N$ until it becomes equal to the new speed ratio, the actual rotational speed ratio r is adjusted so as to closely follow this target value $r_0$, thus causing a smooth shift to be made without any abrupt application of the band brake 14 which would result in the occurrence of substantial shocks.

Since the periods $T_1$ and $T_2$ of the pulse train signals $P_1$ and $P_2$ produced by the input shaft revolution speed sensor 21 and the output shaft revolution speed sensor 22 are used, the actual speed ratio r can be detected at the instant whenever every two pulses of each of the pulse train signals $P_1$ and $P_2$ have been generated. As a result, it can be detected within a short length of time.

This, therefore, has realized a feedback control with excellent precision as shown by the flow chart shown in FIG. 4 where the actual speed ratio value r is brought into agreement with the target value $r_0$.

Although, in the above mentioned embodiment, the input shaft revolution speed sensor 21 and the output shaft revolution speed sensor 22 are mounted directly to the input shaft 10 and the output shaft 11, respectively, sensors of the type which indirectly detect the revolution speed may be used as long as they generate a pulse train signal with a frequency variable with the rotational speed of the input shaft and the output shaft. For example, the sensors may be mounted to the planetary gear sets 18 and 19 or a rotational angle sensor and a vehicle speed sensor for a speed meter may be used as such sensors.

Alternatively, rather than varying the duty ratio $D_{ON}$ of each of the excitation currents Sa to Sd supplied to the seolenoid valves by a predetermined amount $|d|$, the variation may be altered in response to the speed ratio or the engine load. In this case, the variation $|d|$ may be altered in response to the speed ratio or the engine load directly or the variation $|d|$ that is constant may be multiplied with a coefficient variable with the speed ratio or the engine load.

The variation characteristic of the target value $r_0$ is not limited to that illustrated in FIG. 5 and may be set as desired as long as it is effective in decreasing shift shocks.

Referring to FIGS. 6 to 9, a second embodiment is described hereinafter.

Figure 6:
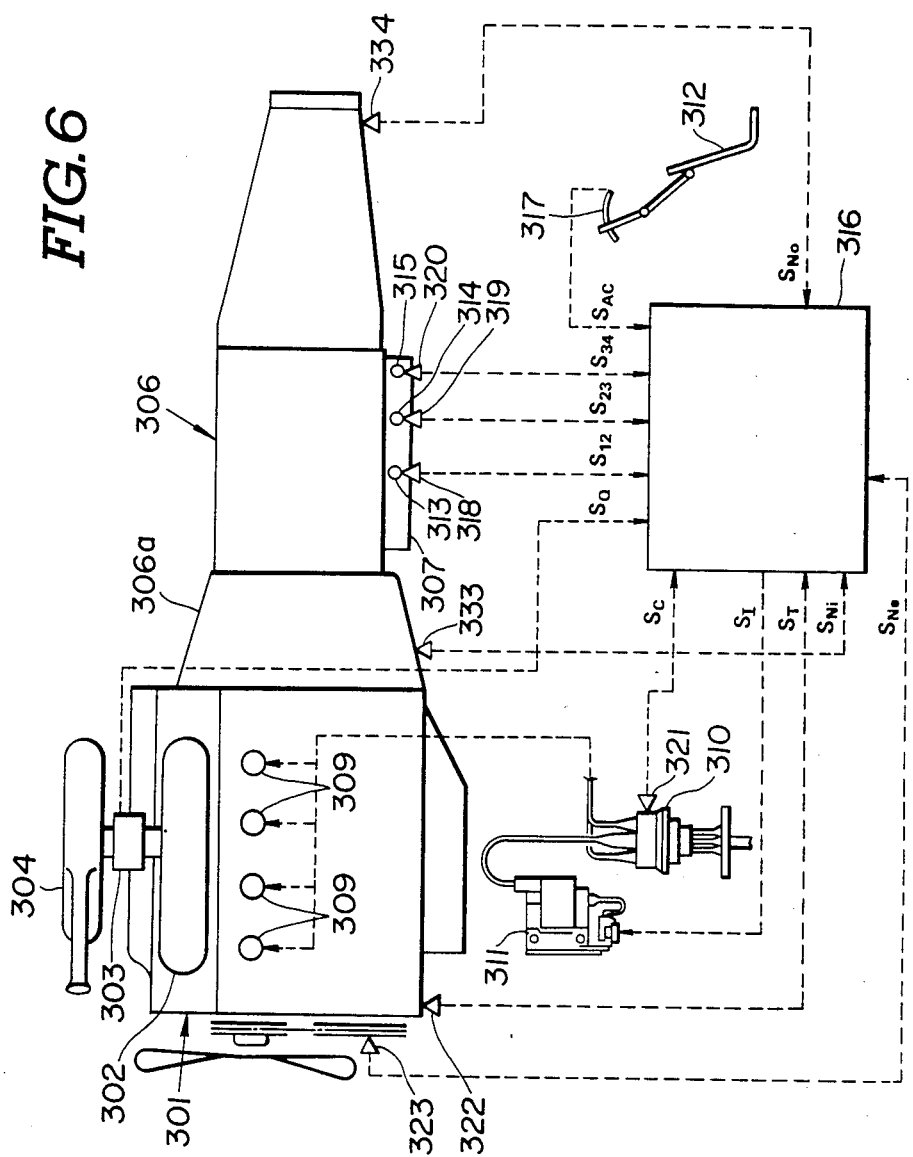
FIG. 6 is a block diagram of a power train for a motor vehicle incorporating a second embodiment according to the present invention.

Referring to FIG. 6, there is illustrated an engine 301, and an automatic transmission 306 drivingly connected via a torque converter 306a to the engine 301.

The engine 301 has spark plugs 309 provided for its cylinders, respectively, and is provided with a distributor 310. The distributor 310 applies a secondary high voltage that has been generated by continuous supply of a primary electric current to the spark plugs 9, selectively, at a timing determined by a spark timing controller 311 under the control of a spark timing control signal $S_I$. The engine 301 increases its output as an accelerator pedal 312 is depressed deeply because the flow rate of intake air increases in response to the depression of the accelerator pedal 312 and the amount of fuel injection by an injector (not illustrated) also increases in response to the depression of the accelerator pedal 312. This engine output is fed to the automatic transmission 306 via the torque converter 306a.

Owing to a 1-2 shift valve 318, a 2-3 shift valve 314 and a 3-4 shift valve 315 within a hydraulic pressure control system 307, the automatic transmission 306 automatically selects a gear position out of four gear positions which is suitable for a running condition of the vehicle.

Figure 7:
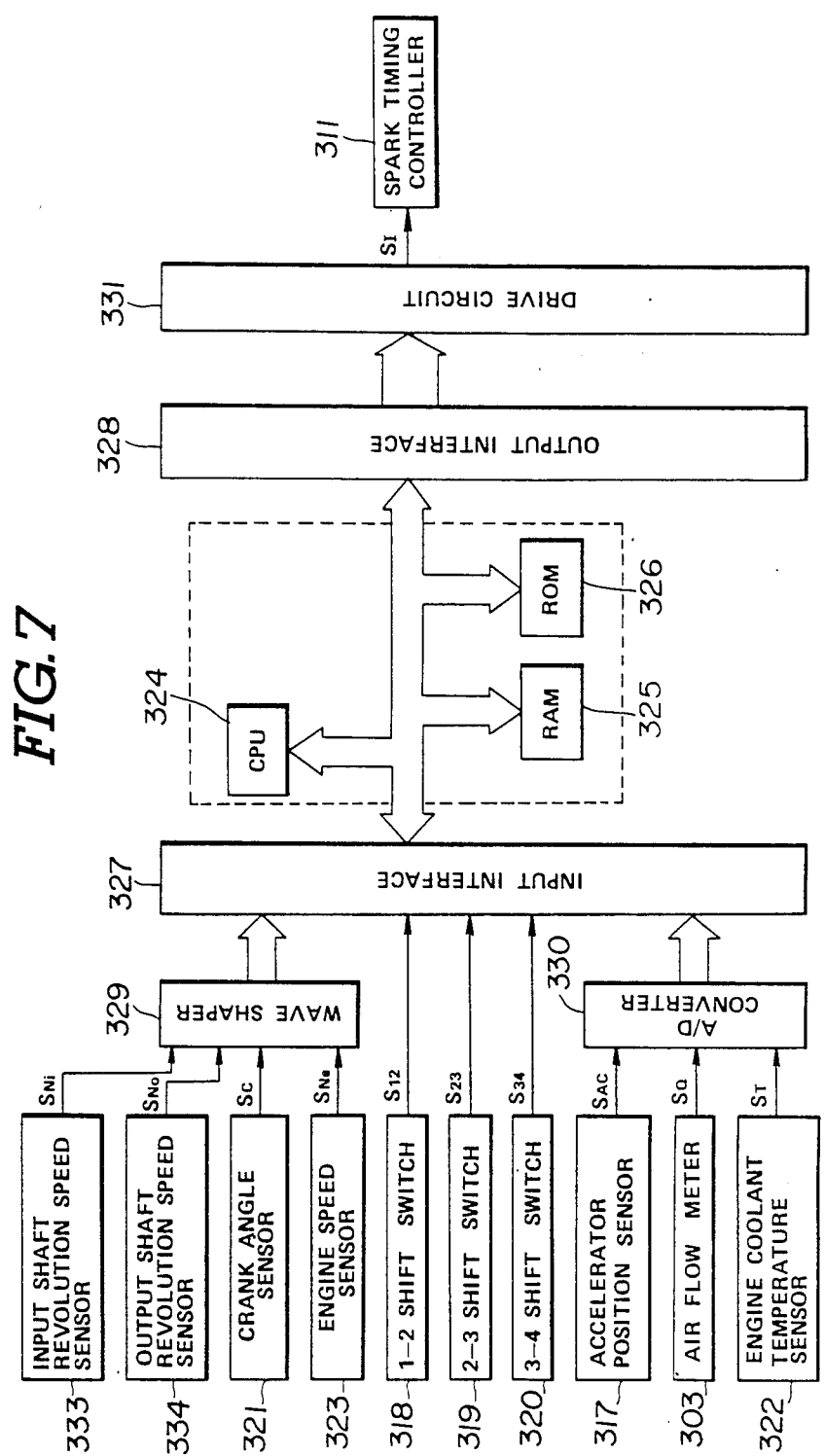
FIG. 7 is a block diagram of a control unit.

A control unit 316, as shown in FIG. 7, is a microcomputer based system which is provided with a CPU 324, a RAM 325, a ROM 326, an input interface circuit 327, an outut interface circuit 328, a wave shaper 329, an A/D converter 330, and a drive circuit 331.

Input signals fed to the control unit 316 comprise an input shaft revolution speed signal $S_{Ni}$ of an input shaft revolution speed sensor 33, an output shaft revolution speed signal $S_{No}$ of an output shaft revolution speed sensor 334, a crank angle signal $S_c$ of a crank angle sensor 321, an engine speed signal $S_{Nc}$ of an engine speed sensor 323, a 1-2 shift signal $S_{12}$ of a 1-2 shift switch 318, a 2-3 shift signal $S_{23}$ of a 2-3 shift switch 319, a 3-4 shift signal $S_{34}$ of a 3-4 shift switch 320, an accelerator depression signal $S_{AC}$ from an accelerator sensor 317, an intake flow signal $S_Q$ from an air flow meter 303, and a coolant temperature signal $S_T$ from an engine coolant temperature sensor 322. Output signals from the control unit 316 comprise a spark timing control signal $S_I$ to be fed to the spark timing controller 311.

The above mentioned revolution speed sensor 333 and the output shaft revolution speed sensor 334 are similarly constructed and arranged to the sensors 21 and 22 shown in FIG. 1. Pulse train signals generated by the sensors 333 and 334 are fed, as output signals Shd Ni and $S_{No}$ to the wave shaper circuit 329. The wave shaper 329 generates a short rectangular wave pulse in response to the rise of every one of pulses of the signals $S_{Ni}$ and $S_{No}$ fed thereto. The crank angle signal $S_C$ and the engine speed signal $S_{Ne}$ are subject to similar treatment at the wave shaper 329.

The accelerator sensor 317 is constructed of a potentiometer which generates an analog signal variable in proportion to the depression degree (acceleration degree) of the accelerator pedal 312. The accelerator signal $S_{AC}$ from this accelerator sensor 317, an intake air amount signal $S_Q$ from the air flow meter 303 and the coolant temperature signal $S_T$ from the engine coolant temperature sensor 322 are converted to digital signals at the A/D converter 330.

The 1-2 shift switch 318 and 2-3 shift switch 319 are like their counterparts described, for example, in U.S. Pat. No 4,431,095. They are closed and generate low level signals when spools of the 1-2 shift valve 313 and 2-3 shift valve 314 assume downshift positions, respectively, while they are opened and generate high level signals when the spools assume upshift positions, respectively. A 3-4 shift switch 320 is constructed similarly and closed to generate a low level signal when a spool of the 3-4 shift valve 315 assumes a downshift position but opened to generate a high level signal when the spool assumes an upshift position. Thus, the shift signals $S_{12}$, $S_{23}$ and $S_{34}$ are expressed by various combinations of high and low level signals as shown in the following Table.

TABLE

| Shift Signal | Gear Position | | | |
|---|---|---|---|---|
| | 1st | 2nd | 3rd | 4th |
| $S_{12}$ | L | H | H | H |
| $S_{23}$ | L | L | H | H |
| $S_{34}$ | L | L | L | H |

In the Table, the reference character H represents a high level signal and the reference character L a low level signal.

Figure 8:
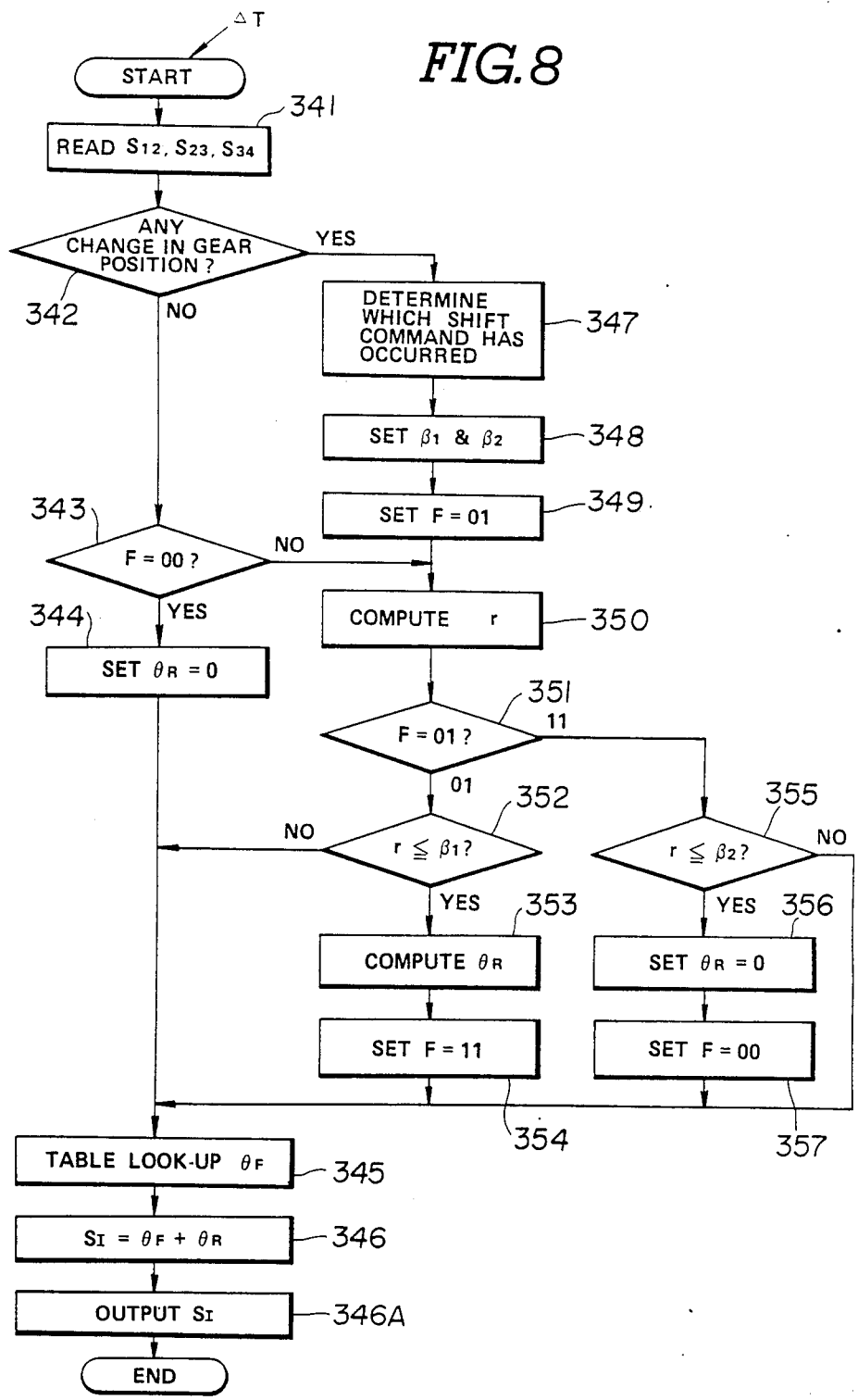
FIG. 8 is a flow chart.

FIG. 8 is a flow chart showing a sequence of operations executed by the above mentioned control unit 316.

The series of operations illustrated in FIG. 8 is started by turning ON an ignition switch and the execution thereof is repeated after a length of time $\Delta T$.

First of all, at a step 341, a shift position signal $S_{12}$ or $S_{23}$ or $S_{34}$ coming out of the 1-2 shift switch 318, 2-3 shift switch 319 and 3-4 shift switch 320 is read, and at a step 342, a decision is made whether any change in gear position signal occurred.

If, now, no change in gear position signal took place, a flag F is reset as 00 at a step 343, and then a retard $\theta_R$ is set as 0.

At a step 345, an ordinary spark timing $\theta_F$, i.e., an appropriate spark timing for non shifting state, is obtained by a table look-up of a data table of ordinary spark timing $\theta_F$ which is preset versus data including accelerator signal $S_{AC}$, intake air flow signal $S_Q$, and coolant temperature signal $S_T$ based on the accelerator signal $S_{AC}$, the intake air flow signal $S_Q$, and the coolant temperature signal $S_T$ which have been obtained in another routine (not illustrated).

At a step 346, a spark timing control signal $S_I$ to be fed to the spark timing controller 311 is given as a sum $(\theta_F + \theta_R)$ of the ordinary spark timing $\theta_F$ and its correction, i.e., a retard $\theta_R$. As a result, the spark timing of the engine 301 is adjusted to $\theta_F + \theta_R$.

Since, when the decision that no change in gear position signal is made, the retard $\theta_R = 0$, the spark timing $\theta$ of the engine 301 is adjusted to the ordinary spark timing $\theta_F$, thus permitting the engine to produce an appropriate output for running state of the vehicle.

If the decision made at the step 342 turns out to be YES, i.e., a case where a change in gear position signal occurred, a determination is made based on gear position signals before and after the decision making at the step 342 what kind of change in gear position has occurred, i.e., which shift command has occurred step 347. That is, what is done at the step 347 is to determine which one of 1-2 shift command, 2-3 shift command and 3-4 shift command has occurred.

At a step 348, a first reference value $\beta_1$ and a second reference value $\beta_2$ which are preset for content of the shift command determined are obtained after reading the data in the memory. These reference values $\beta_1$ and $\beta_2$ are used to determine the instant when a shift is initiated and the instant when it is completed, and a different pair of values is set for every different shift command.

At a step 349, the flag F=01 is set. The fact that the flag F=01 is set is memorized by the computer as the occurrence of a change in gear position signal.

Figure 9:
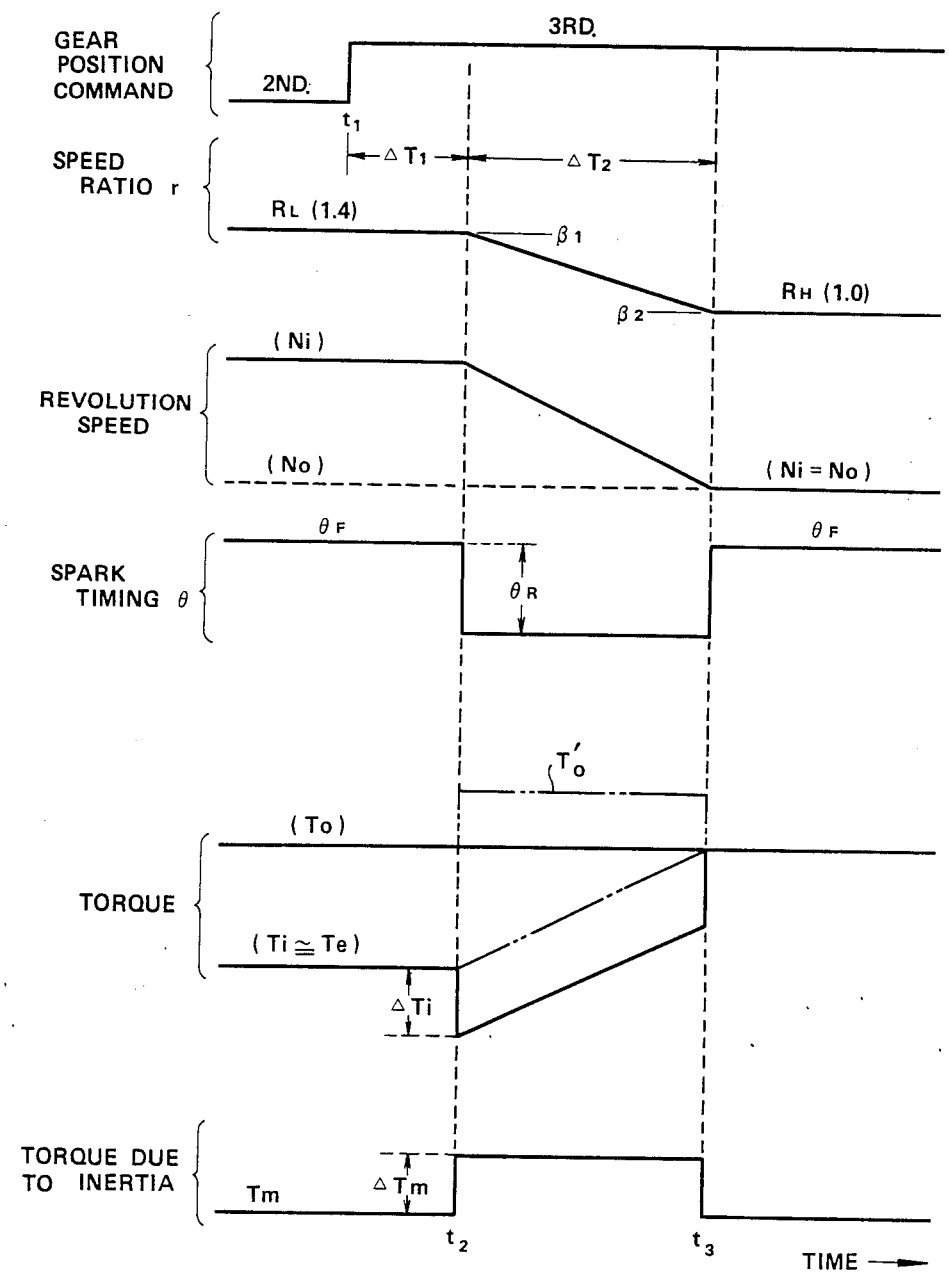
FIG. 9 is a timing diagram showing the characteristic of operation of the second embodiment.

Referring to FIG. 9, assuming now that the gear position signal has changed from the second to the third gear position (2-3 shift) at the instant $t_1$, a decision is made that there has occurred a change in gear position command in the first run immediately after the instant $t_1$ and the steps 347, 348 and 349 are exeucted.

At a step 350, an input shaft revolution speed Ni is obtained from the output signal $S_{Ni}$ of the input shaft revolution speed sensor 333 and an output shaft revolution speed No is obtained from the output signal $S_{No}$ of the output shaft revolution speed sensor 334, and their ratio Ni/No is obtained and set as the actual speed ratio r.

More particularly, the actual speed ratio r is given by finding a period of a pulse train signal in a similar manner to the first embodiment.

At a step 351, a decision is made whether the content of the flag F is 01 or 11. Since, now, the content of the flag is 01, a step 352 is executed where the speed ratio r is compared with the first reference value $\beta_1$. In the case as illustrated in FIG. 9, for example, the speed ratio changes from $R_L(1.4)$ to $R_H(1.0)$ during a 2-3 shift, the setting of the first reference value $\beta_1$ is such that it is less than and very near $R_L$. On the other hand, the second reference value $\beta_2$ is given $R_H$.

Referring to FIG. 9, during the response delay $\Delta T_1$, the speed ratio r continues to stay at $R_L$, causing the decision made at the step 352 to end in NO. Under this condition, the spark timing is kept at the ordinary spark timing $\theta_F$ owing to the operations at the steps 345, 346 and 346A.

Hereinafter, the series of operations through the steps 341 to 343, 350 to 352, 345, 346 is executed repeatedly until r becomes equal to or less than $\beta_1$. When r becomes equal to or less than $\beta_1$, the decision made at the step 352 results in YES, allowing the execution of a step 353 wherein the retard $\theta_R$ is determined by computation. Possible manners of such computation include giving the retard $\theta_R$ by performing arithmetic operations based on the content of the shift command and the ordinary spark timing $\theta_F$, and giving the retard $\theta_R$ by table look-up of a preset data table. The retard $\theta_R$ is a retard angle large enough to suppress the occurrence of a variation $T_o'$ in output torque $T_o$ of the automatic transmission 306 that would otherwise take place during the shift (see FIG. 9).

At the next step 354, the flag F=11 is set. This causes the computer to memorize that the speed ratio r has become lower than the first reference value $\beta_1$ and the actual shift operation has begun.

Since the retard $\theta_R$ has been set by computation in the above mentioned manner, the spark timing contol signal $S_I$ is corrected at the step 346 such that it takes a value expressed as $\theta_F + \theta_R$. As a result, the spark timing $\theta$ of the engine 1 is retarded from the ordinary spark timing $\theta_F$ by $\theta_R$ as illustrated in FIG. 9.

This causes the engine output Te to drop, causing the input torque Ti to drop by $\Delta Ti$. This drop works to offset the variation $\Delta Tm$ in the torque Tm owing to the inertia which variation is caused by the shift operation. As a result, shocks are alleviated.

The above mentioned retard action of the spark timing continues until the speed ratio r becomes lower or equal to the second reference value $\beta_2$. This series of operations is maintained because the decision made at the step 351 always results in 11 and the decision made at the step 355 alway results in NO until r becomes lower or equal to $\beta_2$.

When the shift in the automatic transmission 306 is completed (at the instant $t_3$), the speed ratio r becomes equal to the second reference value $\beta_2$. This causes the decision made at the step 355 to turn out to be YES, allowing the execution of steps 356 and 357 where the retard $\theta_R = 0$ is set and the flag F is reset as 00. As a result, the retard action of the spark timing is terminated, thus causing the spark timing return to the ordinary level.

As described above, according to this embodiment, the initiation of a shift in the automatic transmission 306 and the completion thereof can be recognized accurately by monitoring the speed ratio, and the engine output is dropped by retarding the spark timing of the engine 301 during the transient period from the initiation of the shift to the completion thereof, preventing the occurrence of shocks during the shift. Since the engine output control mentioned above is always timed with the initiation of the shift owing to a feedback control by monitoring the speed ratio r, the occurrence of shocks is alleviated to a sufficiently low level without any secondary shocks.

Figure 10:
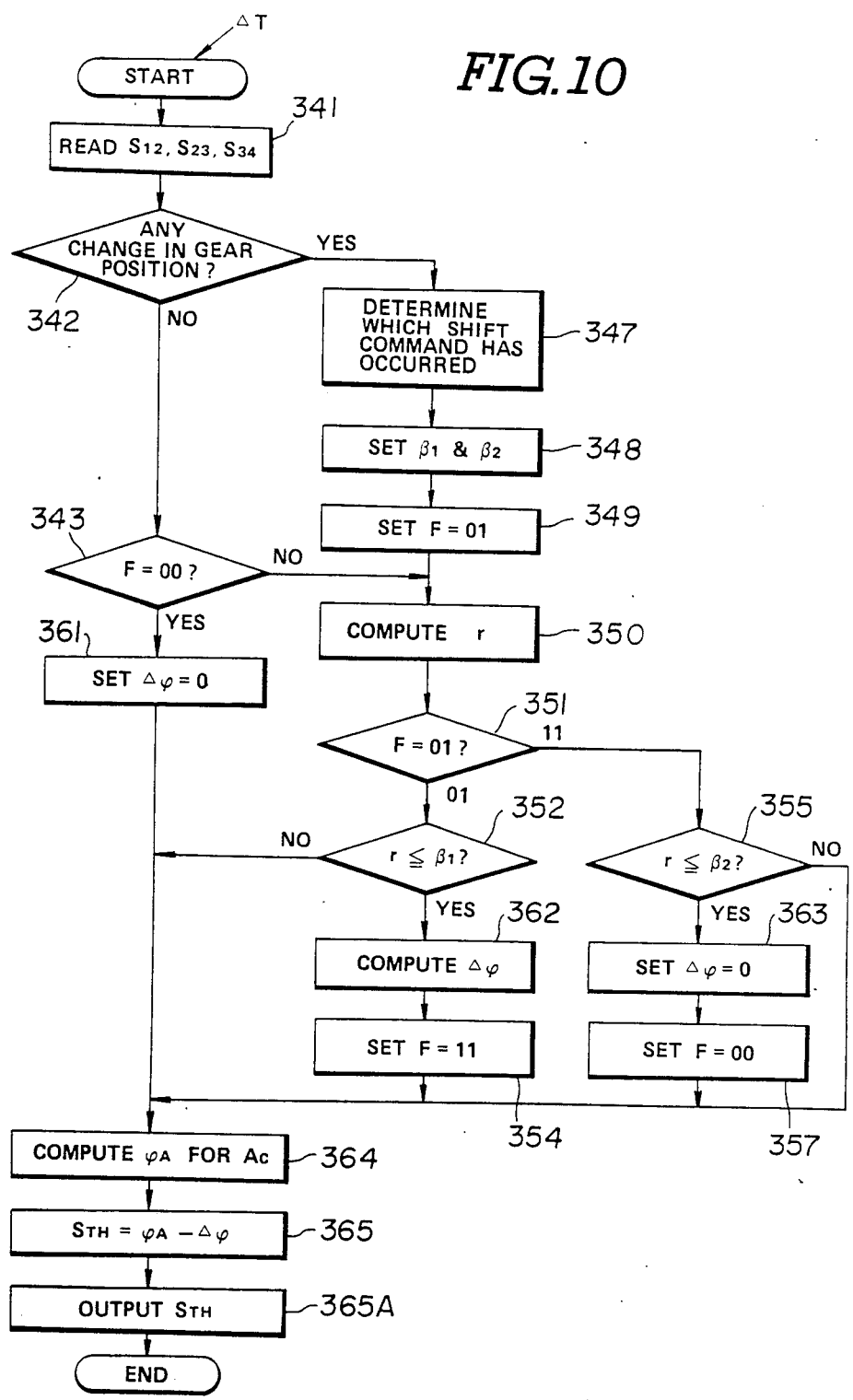
FIG. 10 is a flow chart illustrating the operational characteristic of a third embodiment.
Figure 11:
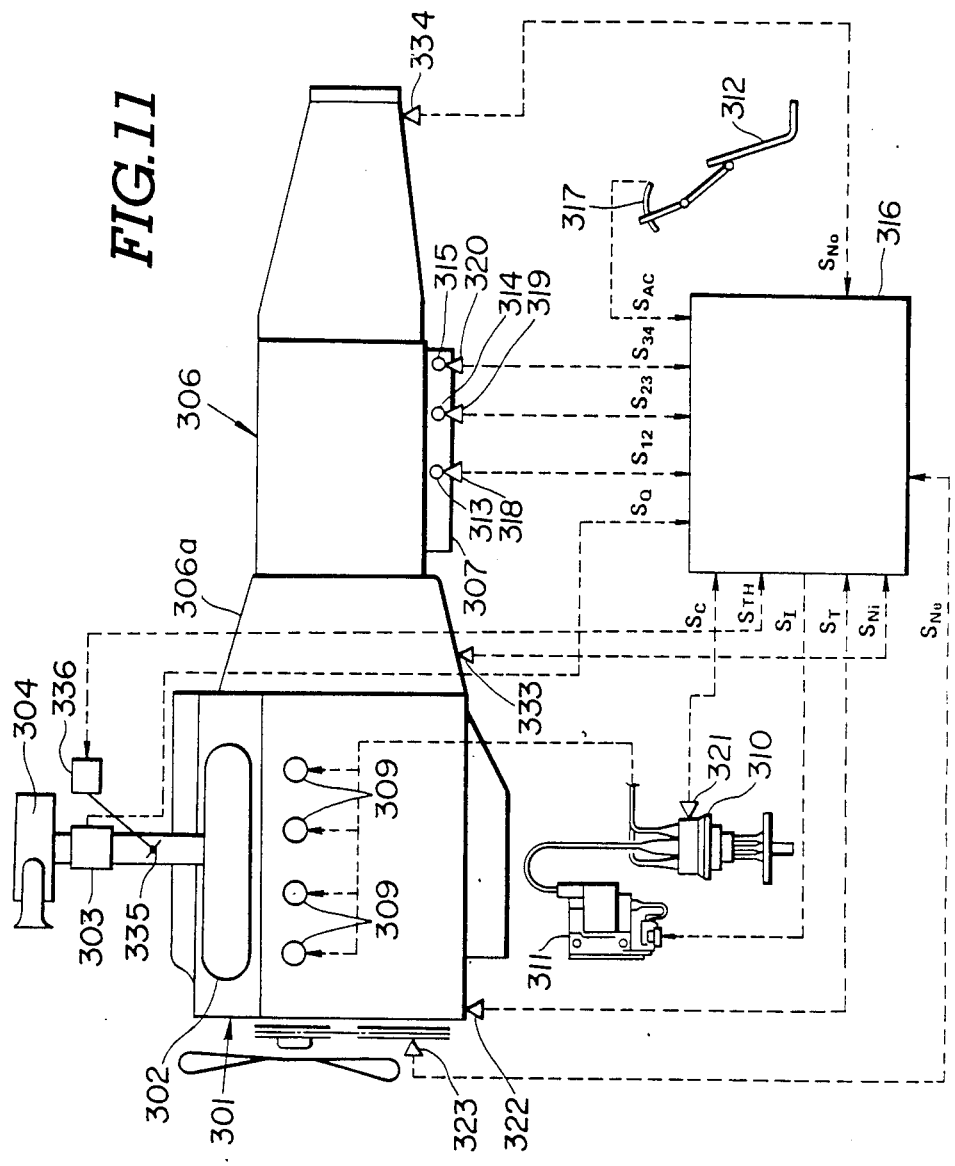
FIG. 11 is similar view to FIG. 6 showing the third embodiment.

Referring to FIGS. 10 to 13, a third embodiment is described. This embodiment is similar to the second embodiment except that, instead of the spark timing $\theta$, the opening degree $\phi$ of a throttle valve is controlled during a shift to achieve a drop in the engine output. FIG. 10 is a flow chart showing a series of operations executed by a control unit 316 shown in FIG. 11. FIG.

Figure 12:
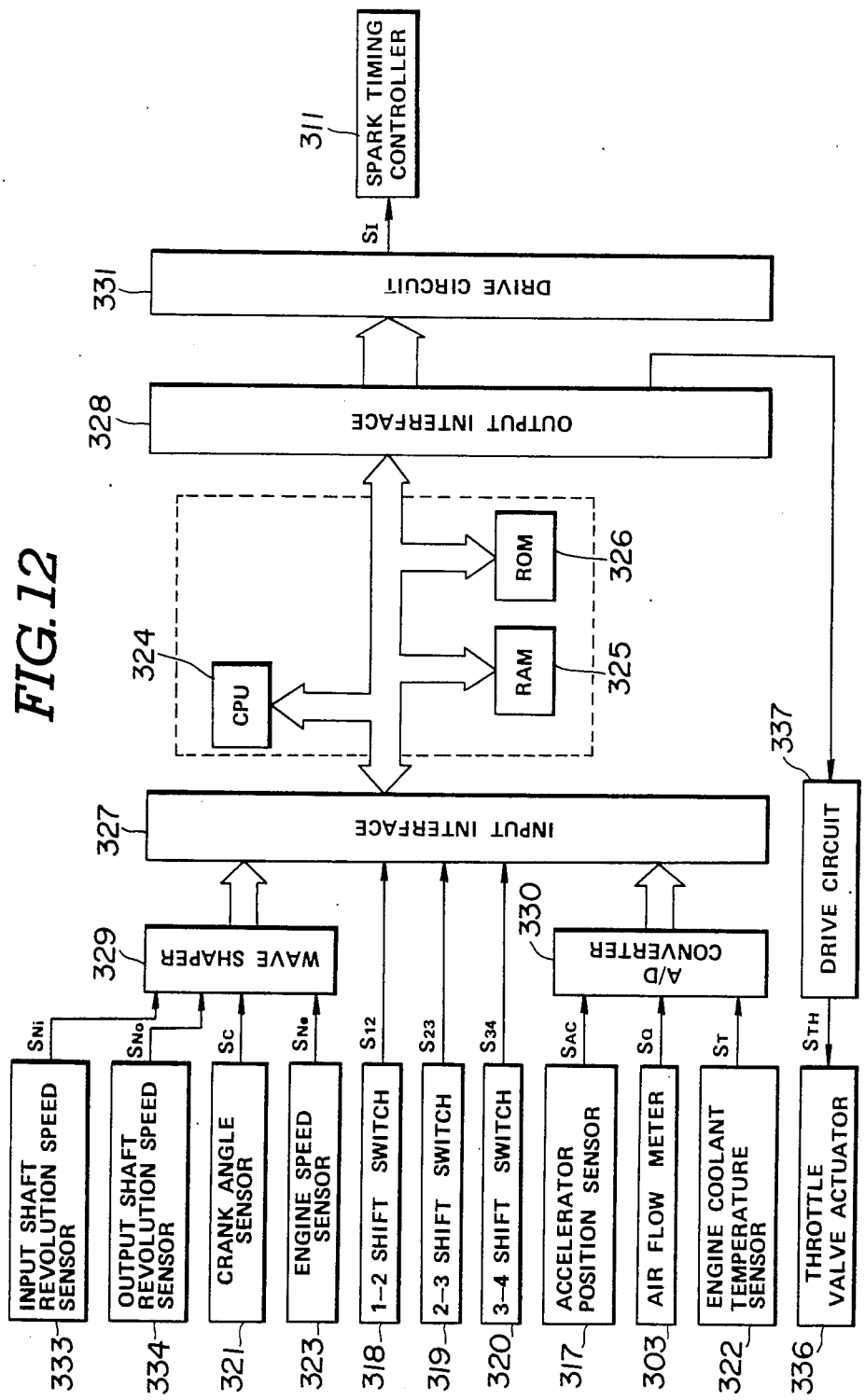
FIG. 12 is a similar view to FIG. 7 showing the third embodiment.

11 is similar to FIG. 6 except the provision of a throttle valve 335 and a throttle vavle actuator 336. The control unit 316 which is specifically shown in FIG. 12 is similar to FIG. 7 except the provision of a drive circuit 357 for the throttle valve actuator 336.

Referring specifically to the flow chart shown in FIG. 10, the content of the control is different from that of the second embodiment only in that the operations of the correction $\theta_R$ (the retard) of the spark timing, of the ordinary spark timing $\theta_F$, and of the spark timing control signal $S_I$ have been replaced with the operations of a correction $\Delta\phi$ of the throttle opening degree, of a throttle opening degree $\phi_A$ and of a throttle opening degree signal $S_{TH}$, respectively, (see steps 361, 362, 363, 364, and 365).

Figure 13:
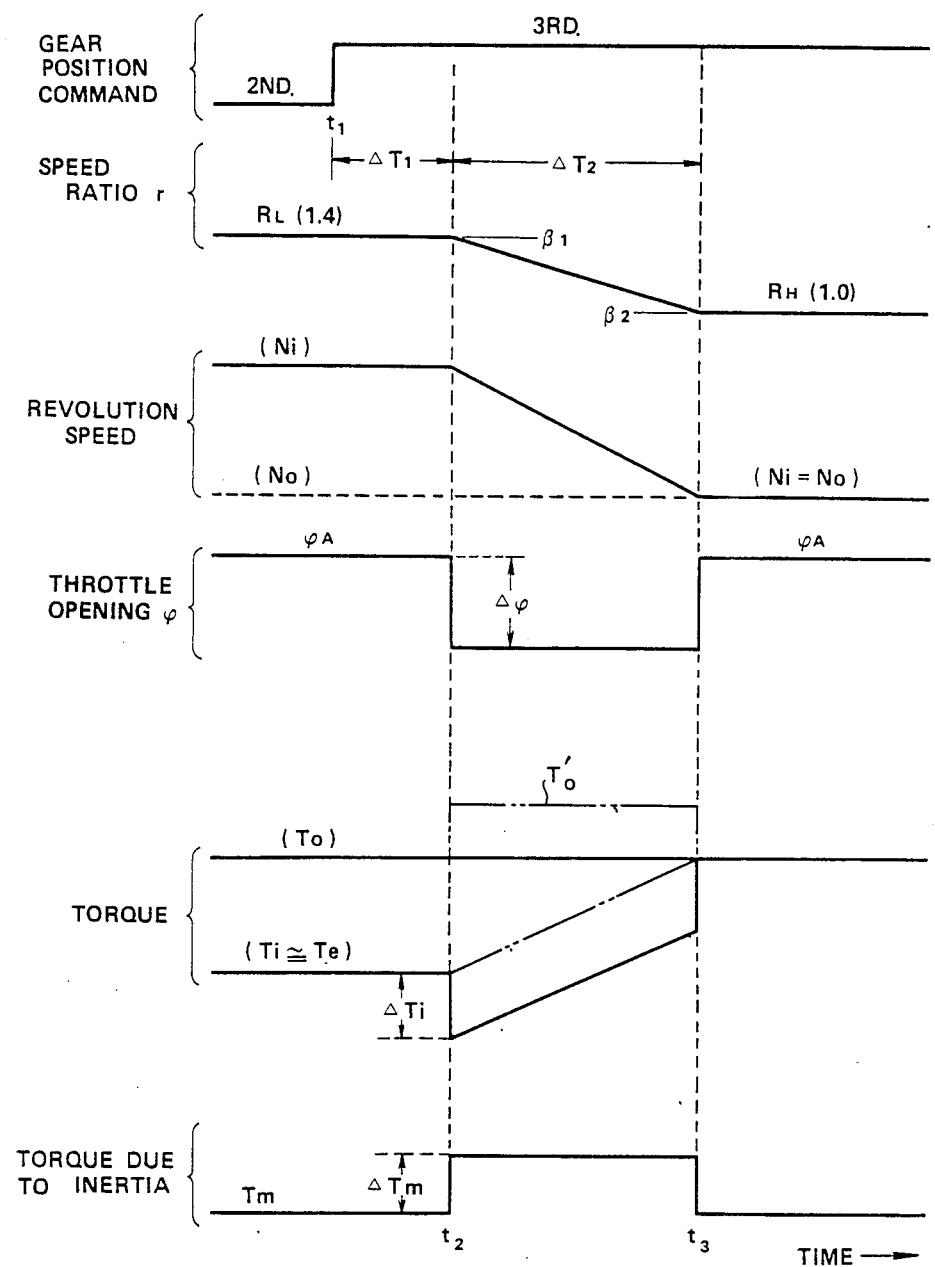
FIG. 13 is a timing diagram.

The operation of this third embodiment will be readily understood from FIG. 13.

Figure 14:
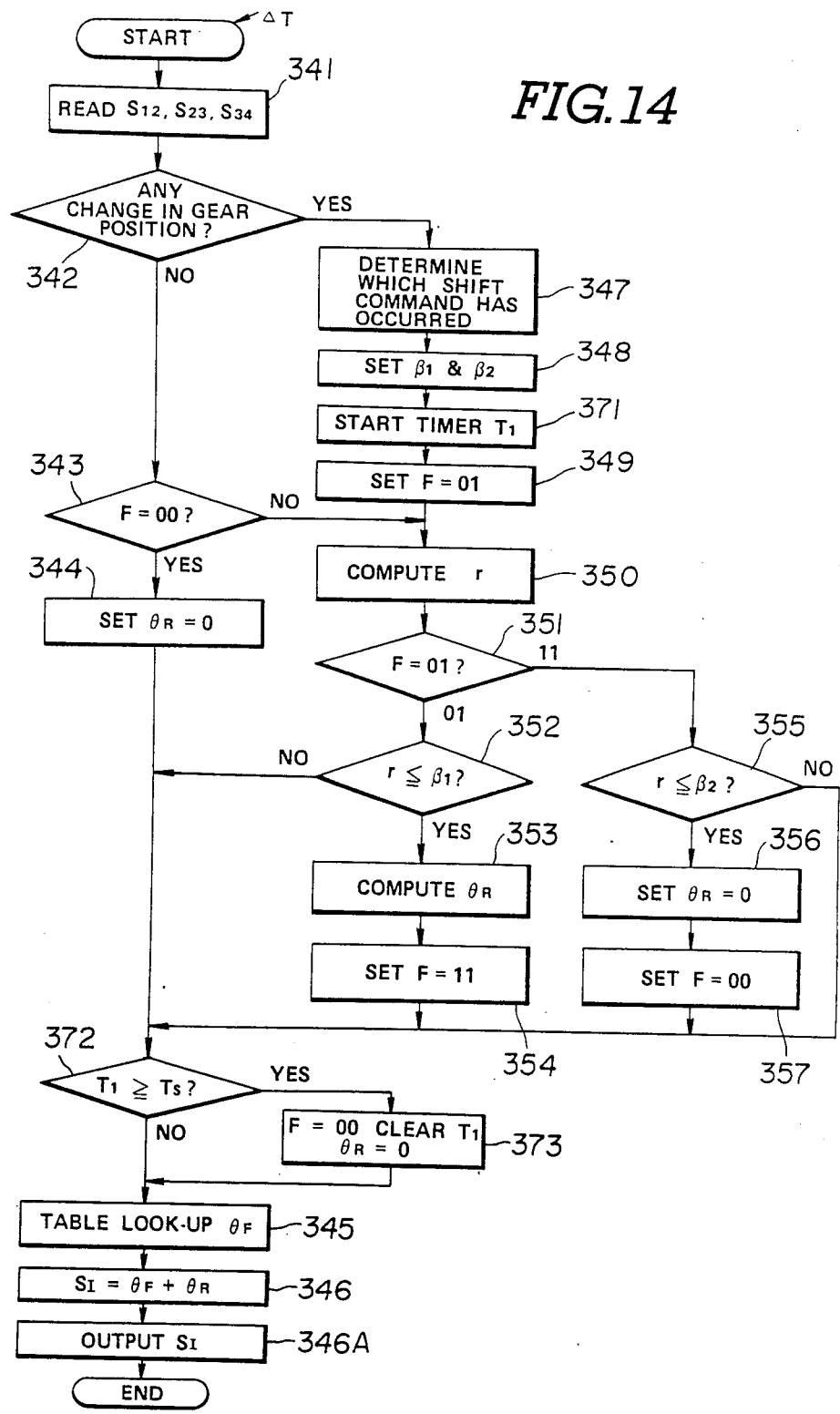
FIG. 14 is a flow chart illustrating the operational characteristic of a fourth embodiment.

Referring next to FIG. 14, there is a flow chart illustrating the content of operations carried out in a fourth embodiment according to the invention. The construction of this embodiment is substantially the same as the second embodiment (see FIGS. 6 and 7).

The flow chart of this embodiment is different from that of the seconed embodiment (see FIG. 8) only in the provision of new steps 371, 372 and 373.

Figure 15:
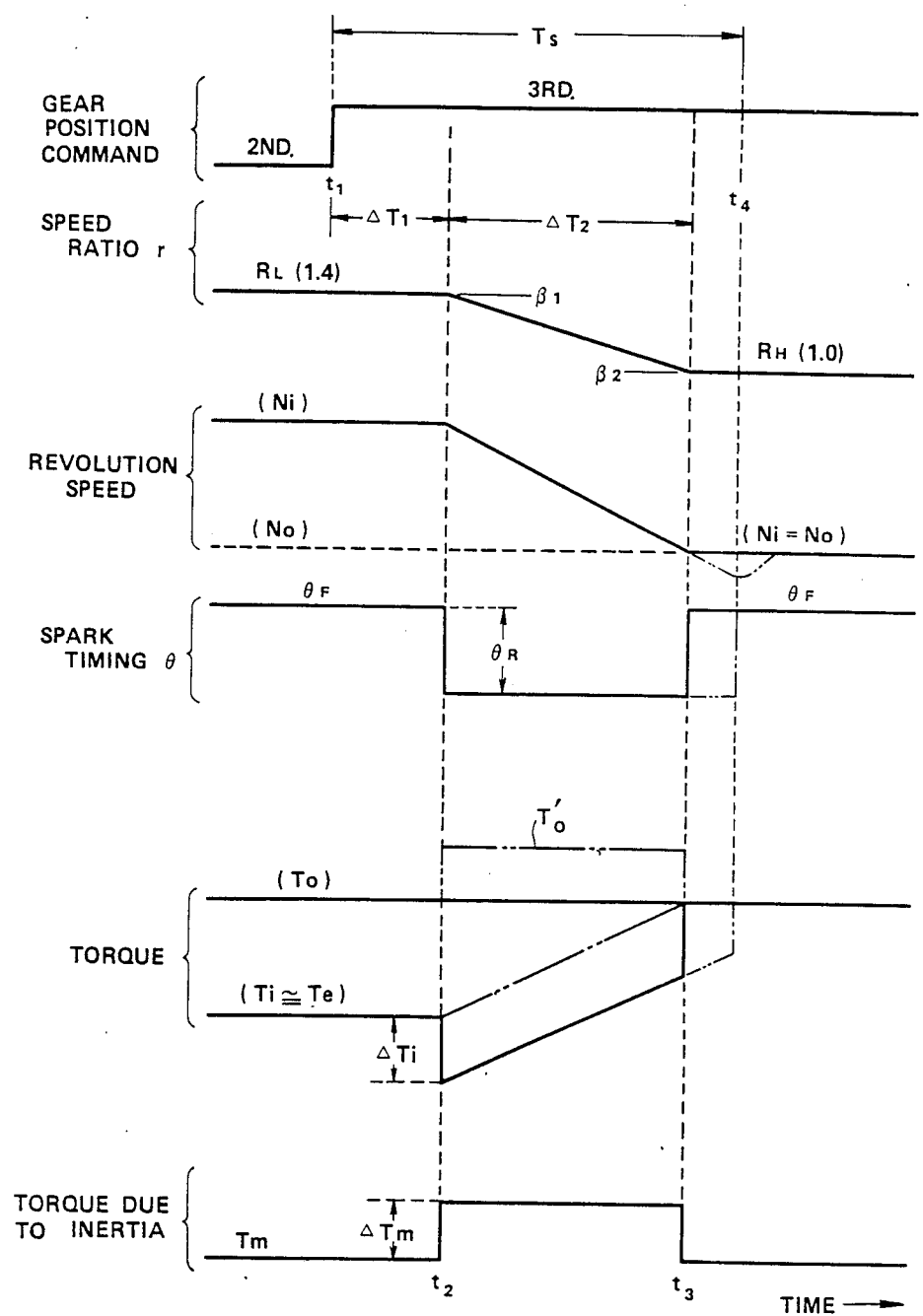
FIG. 15 is a timing diagram.

At the step 371, a timer $T_1$ is started so as to measure time $T_1$ beginning with the instant $t_1$ (see FIG. 15).

At the step 372, a decision is made whether the time $T_1$ measured is equal to or greater than a reference time value Ts. If $T_1$ is equal to or greater than Ts, the step 373 is executed where the flag F is reset, the timer $T_1$ is cleared, and the retard $\theta_R$ in spark timing is set as 0 (zero). As shown in FIG. 15, the reference time value Ts must be sufficiently long enough to cover a length of time beginning with the instant $t_1$ when there is a change in gear position command and ending with the instant $t_3$ when shift in the automatic transmission 306 is completed.

This embodiment operates in the same manner as the second embodiment under the normal condition where decisions that the speed ratio r drops below the first reference value $\beta_1$ and then it drops below the second reference value $\beta_2$ are made normally.

If an abnormal condition occurs where owing to a malfunction due to an error in the signal system or noise, the decision that r is lower than or equal to $\beta_2$ fails to be made, i.e., the completion of the shift fails to be recognized, the operation of the engine with the spark timing $\theta$ retarded continues even after the instant $t_3$, thus allowing the engine to continue to produce the engine output Te of the decreased level. In order to provide a safeguard against the occurrence of this event, the reatard control of the spark timing is terminated when the time $T_1$ measured exceeds the above mentioned reference time value Ts thereby to prevent the occurrence of the undesirable event.

Figure 16:
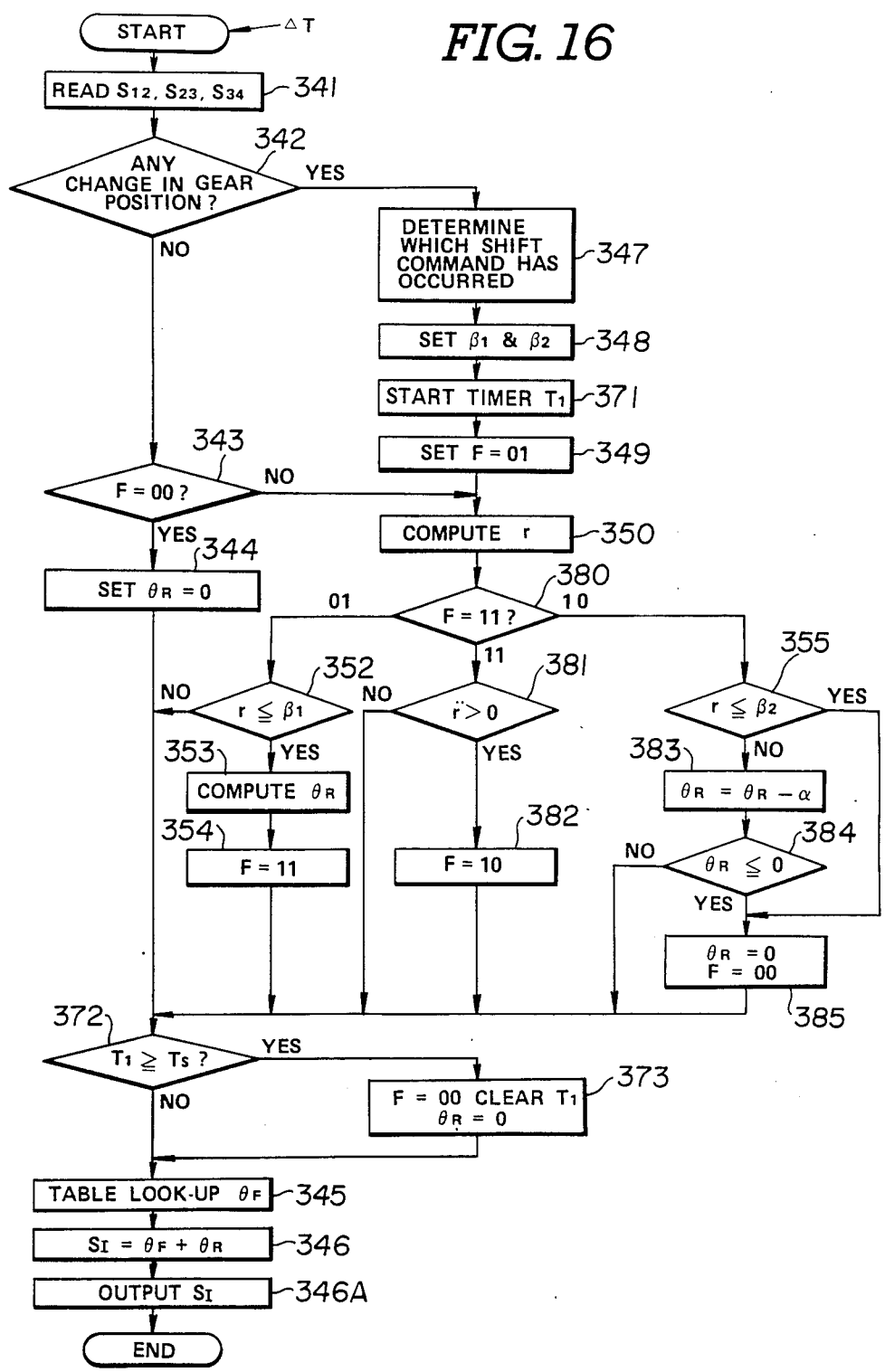
FIG. 16 is a flow chart illustrating the operational characteristic of a fifth embodiment.

Referring to FIG. 16, there is a flow chart illustrating the content of operations carried out by a fifth embodiment according to the invention. The other construction is the same as the above mentioned fourth embodiment.

The content of the control is substantially the same as that shown by the flow chart in FIG. 14 except the provision of steps 380 to 385.

At the step 380, a decision is made whether the content of the flag F is 01 or 10 or 11. If the flag F is equal to 11, the step 381 is executed where a decision is made whether the sign of a second derivative r of the speed ratio r is positive or negative. What is done at this step is to decide whether a first derivative r of the speed ratio r is on the incline or decline. If the second derivative r is less than or equal to zero, the flag F=11 is maintained, thus leaving the spark timing $\theta$ subject to retard $\theta_R$. If the second derivative r is greater than zero, the step 382 is executed where the flag F=10 is set, thus allowing the execution of the step 355 after the step 380. At the step 355, a decision is made whether r is less than or equal to $\beta_2$.

If r is greater than $\beta_2$, the step 383 is executed where the retard $\theta_R$ is decreased by a predetermined value $\alpha$ (alpha), and then the step 384 is executed where a decision is made whether the result $\theta_R$ of operation at the step 383 is less than or equal to zero. If $\theta_R$ is less than or equal to zero, the step 385 is executed where $\theta_R = 0$ and F=00 are set.

Thus, the operation of decreasing the retard $\theta_R$ by the predetermined value $\alpha$ (alpha) is repeated until r becomes less than or equal to $\beta_2$ or $\theta_R$ becomes less than or equal to zero. When r becomes less than or equal to $\beta_2$ or $\theta_R$ becomes less than or equal to zero, the spark timing is allowed to return to ordinary spark timing $\theta_F$.

Figure 17:
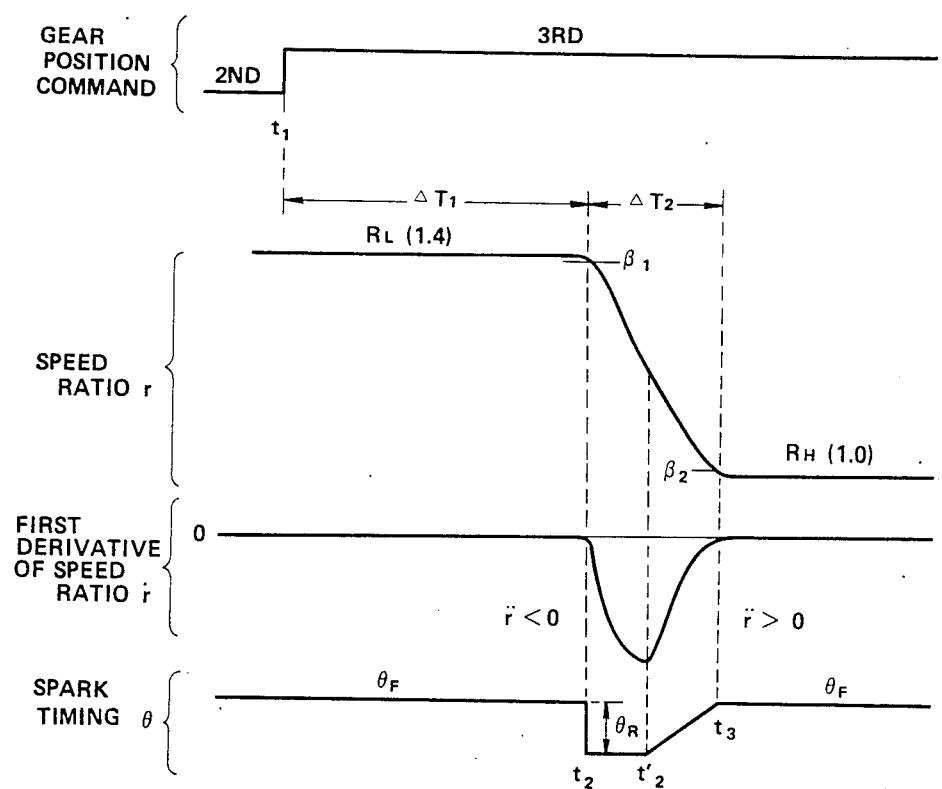
FIG. 17 is a timing diagram.
Figure 18:
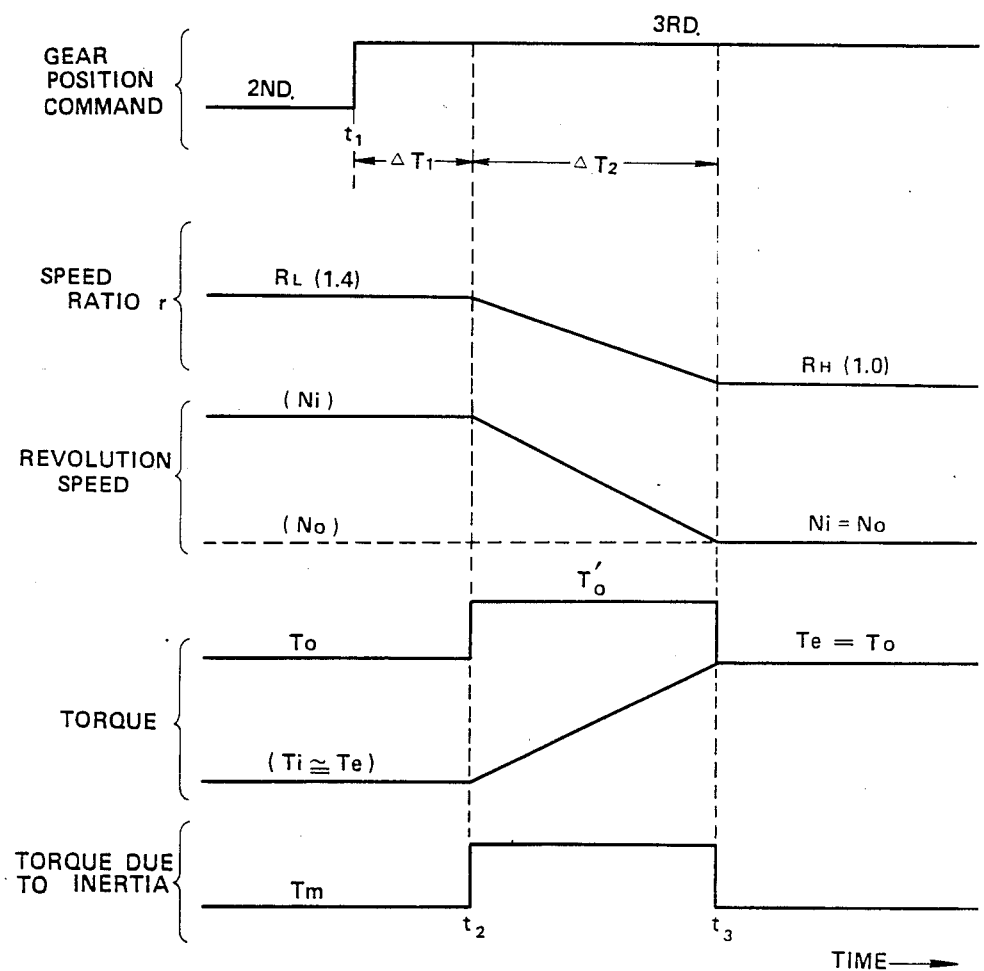
FIG. 18 is a timing diagram used in discussing the prior art.

The operation just described is illustrated in FIG. 17. At the instant $t_1$, a 2-3 upshift command occurs, and then at the instant $t_2$ when r becomes less than or equal to $\beta_2$, the retardation of the spark timing $\theta$ starts. At the instant $t_2'$ when the rate at which the first derivative r of the speed ratio r decreases (the second derivative r becomes greater than zero), the spark timing starts to increase gradually, and returns to the ordinary spark timing $\theta_F$ at the instant $t_3$ when r becomes less than or equal to $\beta_2$.

The advantage given by this control whereby the output torque of the engine varies smoothly near the instant when the actual shift operation is completed is that the occurrence of secondary shift shocks is alleviated, which secondary shift shocks would be occurred in the event where the variation To' in the output torque To of the automatic transmission during the shift decreases gradually at the instant $t_3$ rather than it decreases abruptly, or where the amount of the drop $\Delta$Ti in the engine output is less than that of the torque variation $\Delta$Tm due to the inertia.

As will be readily understood from the flow chart shown in FIG. 16, similarly to the flow chart shown in FIG. 14, the retarding of the spark timing is forcibly terminated after a predetermined length of time Ts beginning with the instant $t_1$.

The above mentioned value $\alpha$ (alpha) that was constant may be given a value variable with the value of the speed ratio r, and in this case, the step 355 may be skipped if the value of $\alpha$ (alpha) is varied so that the retard $\theta_R$ becomes equal to zero upon completion of the actual shift.

It goes without saying that in order to drop the engine output, the technique of decreasing the throttle opening degree $\phi$ which has been employed in the third embodiment shown in FIGS. 10 to 13 may be applied to the fourth and fifth embodiments (see FIGS. 14 and 16). The technique of controlling the engine output in response to the variation in the second derivative r of the speed ratio r which has been employed by the fifth embodiment (see FIG. 16) may be applied to the third embodiment (see FIG. 10).

In each of the second to fifth embodiments described above, the engine output control for the purpose of decreasing the shift shocks occurring during an upshift has been described, similar control technique used in each of these embodiments may equally used in engine control for reducing shift shocks occurring during a downshift.

When applying to conrolling shift shocks during a downshift, the second to fifth embodiments have to be modified such that the descisions to be made are whether the speed ratio r has exceeded the respective reference values, and the engine output has to be increased during a shift.

In the preceding description, what are employed for controlling the engine output involve a technique of retarding the spark timing $\theta$ and a technique of decreasing the throttle opening $\phi$. However, decreasing the fuel amount supplied to the engine, increasing the exhaust gas recirculation amount, throttling the intake air flow passage and decreasing the charging pressure of the turbo charger are another expedients which may be employed.

Referring to FIGS. 19 to 24, a sixth embodiment according to the present invention is described.

Figure 19:
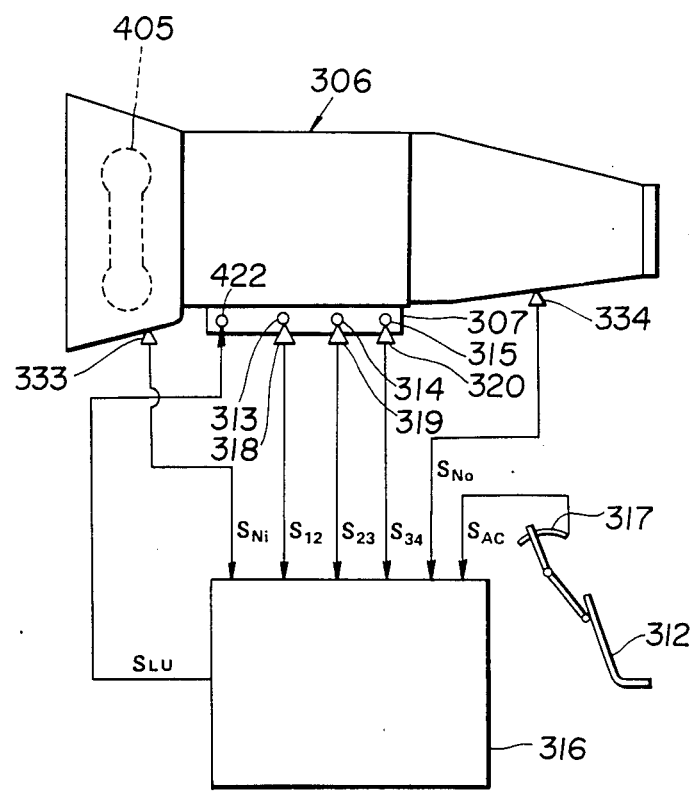
FIG. 19 is a similar view to FIG. 6 showing a sixth embodiment.

Referring to FIG. 19, a lock-up type automatic transmission 306 has an input shaft, not shown, drivingly connected to an engine, also not shown via a lock-up type torque converter 405. It automatically selects one gear position out of first to fourth gear positions in accordance with running state of a vehicle by the action of a 1-2 shift valve 313, a 2-3 shift valve 314 and a 3-4 shift valve 315 provided in a hydraulic control system 307.

Figure 20:
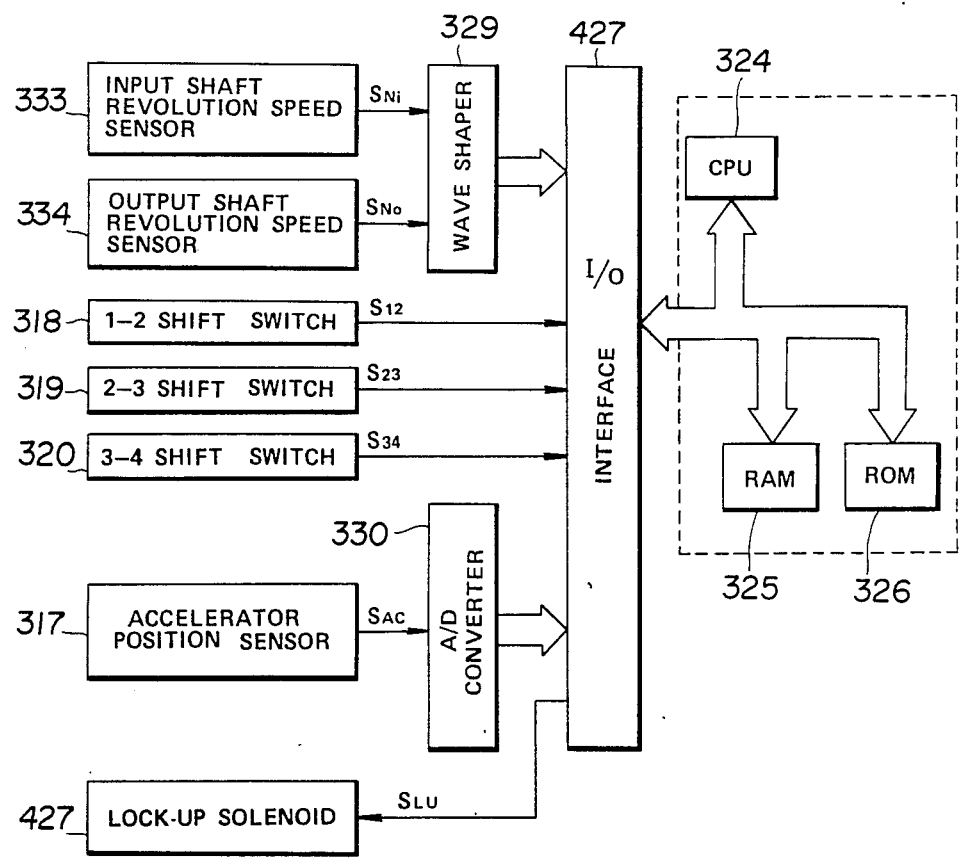
FIG. 20 is a block diagram of a control unit.

As shown in FIG. 20, a control unit 316 is a microcomputer based system that includes a CPU 324, a RAM 325, a ROM 326, an input/output interfeace circuit 427, a wave shaper 329, and an A/D converter 330. Input signals include an input shaft revolution speed signal $S_{Ni}$ from an input shaft revolution speed sensor 333, an output shaft revolution speed signal $S_{No}$ from an output shaft revolution speed sensor 334, a 1-2 shift signal $S_{12}$ from a 1-2 shift switch 318, a 2-3 shift signal $S_{23}$ from a 2-3 shift switch 319, a 3-4 shift signal $S_{34}$ from a 3-4 shift switch 320, and an accelerator position signal $S_{AC}$ from an accelerator sensor 317, while output signals include a lock-up control signal $S_{LU}$ to be supplied to a lock-up solenoid 422. The sensors 333, 334, 317 and shift switches 318, 319, and 320 are substantially the same as their counterparts shown in FIG. 7.

Figure 21:
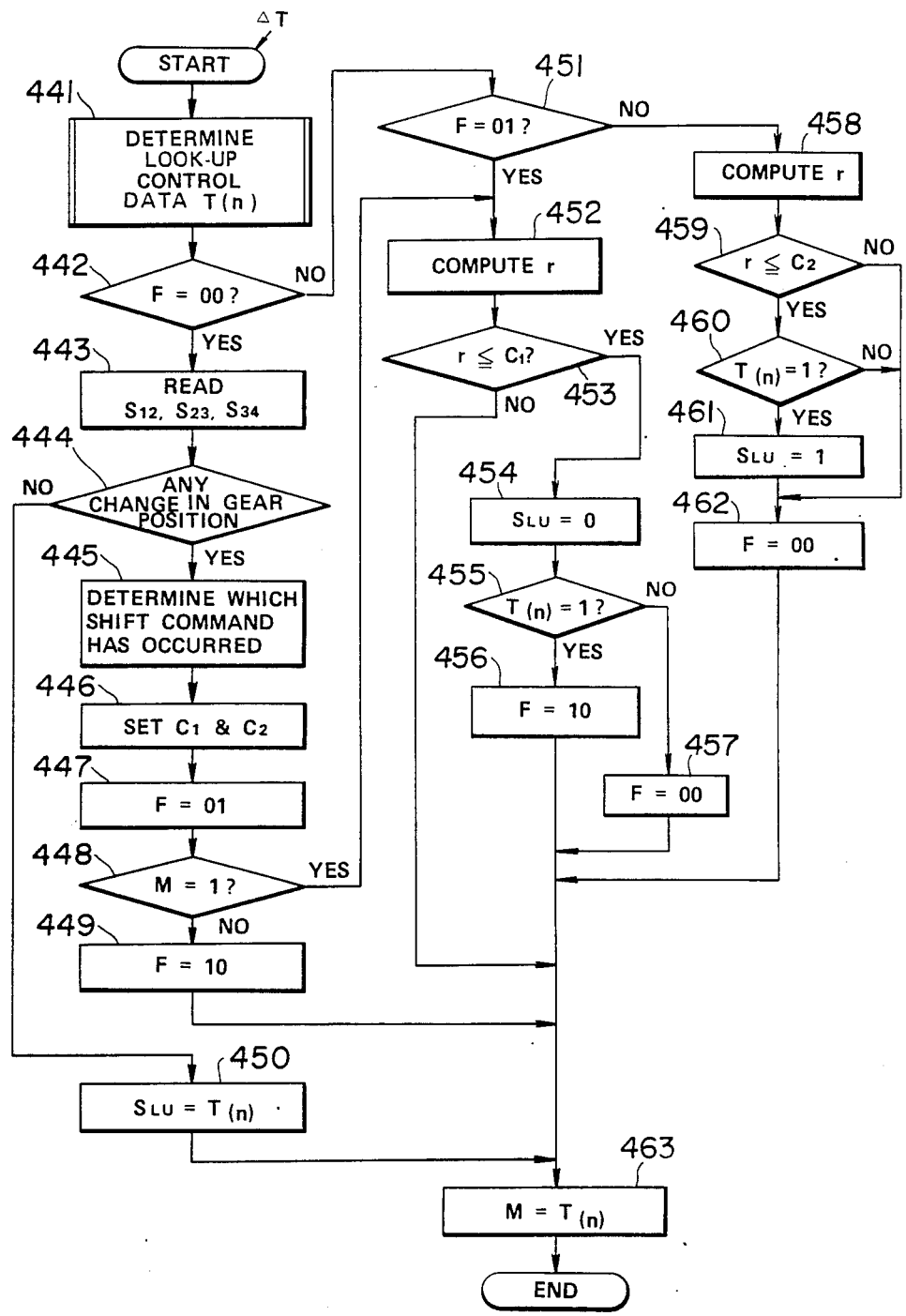
FIG. 21 is a flow chart.

Referring to FIG. 21, there is a flow chart illustrating a series of operations carried out by the above mentioned control unit 316.

The series of operations illustrated in this Figure is initiated after the ignition switch is turned ON, and thereafter the execution of them is repeated after lapse of a predetermined length of time $\Delta T$.

First of all, at a step 441, an arithmetic operation is carried out to determine a lock-up control data T(n). The lock-up control data is obtained using a lock-up schedule (which is stored as a data Table) that is predetermined versus the gear position indicated by the shift signals $S_{12}$, $S_{23}$ and $S_{34}$ and the position of the accelerator as indicated by the accelerator signal $S_{AC}$. If it turns out that lock-up is to be effected, T(n)=1 is set, while it turns out that lock-up is to be released, T(n)=0 is set. The integer n used above designates the number of repetitions the routine shown in FIG. 21.

At a step 442, a decision is made whether the content of a flag F is equal to 00. What is meant by the fact that the flag F is 00 is that neither shift nor lock-up is being carried out. If, under this condition, a change is gear position command is not detected as a result of operations at steps 443 and 444, a step 450 is executed where the lock-up control data T(n) given at the above mentioned step 441 is issued as a control signal $S_{LU}$ for the lock-up solenoid 22 (actually, there is provided a power circuit which turns ON or OFF the excitation current supplied to the lock-up solenoid 422 in response to T(n)). Thus, if the control date T(n) is 1, the lock-up solenoid 422 is turned ON, effecting the lock-up, whereas if the control data T(n) is equal to 0, the lock-up solenoid 422 is turned OFF, releasing the lock-up.

What is done at the step 444 is to determine based on the shift signal $S_{12}$ or $S_{23}$ or $S_{34}$ whether there occurred any change in gear position command. If the result of the decision at this step 444 is YES, the lock-up control which will be described hereinafter will be carried out.

Figure 22:
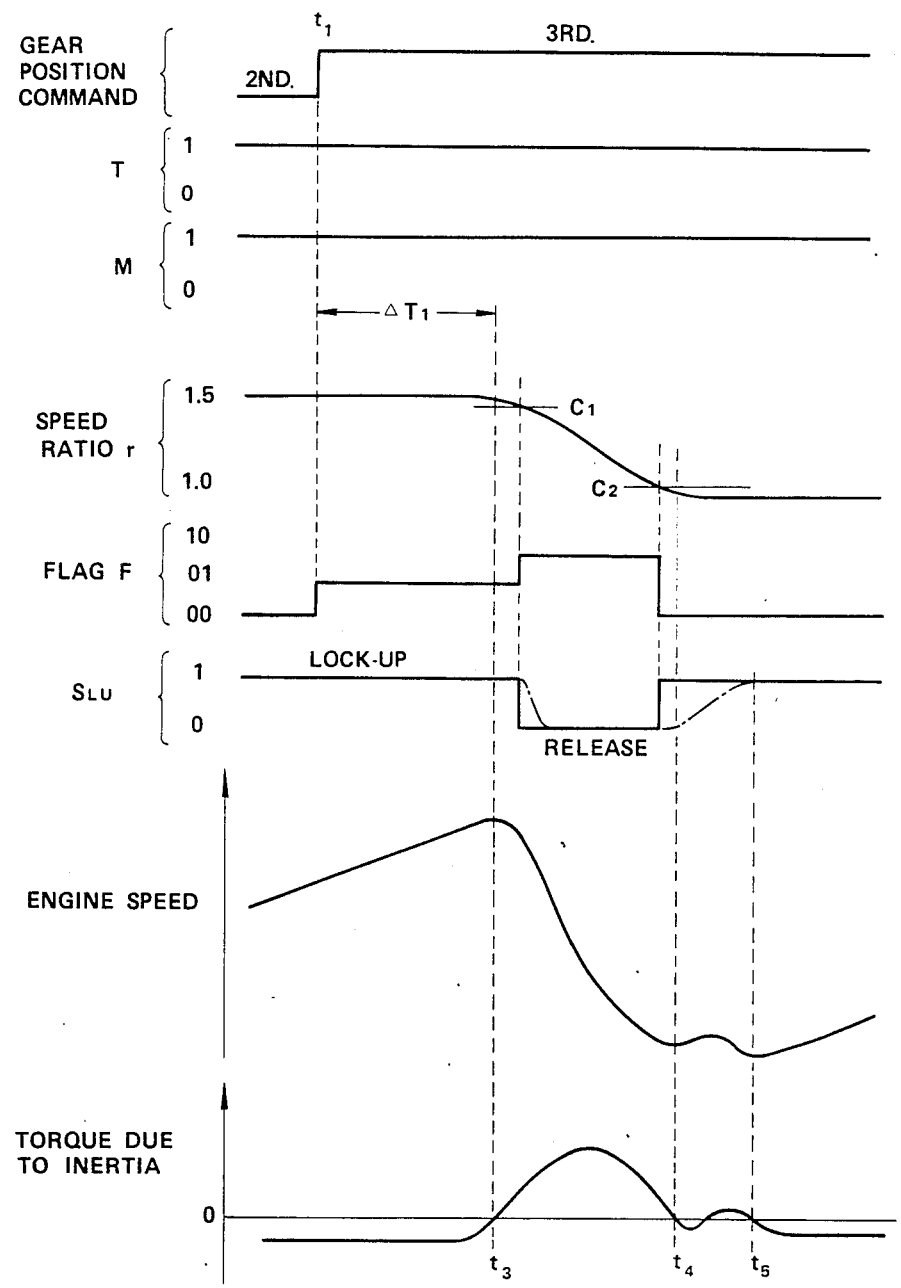
FIG. 22 is a timing diagram.

Hereinafter, in order to make the explnation in detail, a graph shown in FIG. 22 is also referred to.

As an example, an upshift from the second gear position to the third gear position is described. The same control procudure is applicable to the other shift operations.

Prior to the instant $t_1$, the second gear position is maintained and T(n) that has been given at the step 441 is equal to 1. Thus, under this condition, the control signal $S_{LU}$ for the lock-up solenoid 422 is equal to 1, thus allowing the lock-up to be effected.

When there occurs a change in gear position command from the second gear position to the third gear position at the instant $t_1$, steps 445 and 446 of the flow chart shown in FIG. 21 are executed and then the flag F=01 is set at a step 447. At the step 445, the content of the above mentioned change, i.e., the content of the shift demand, is recognized. In this example, the content of the shift recognized is an upshift from the second to the third.

At the step 446, among different pairs of first and second references which are predetermined for various contents of shift, an appropriate one for the content of the shift recognized at the step 445 is set. In this example, as references 2-3 shift, a value that is near but smaller than the speed ratio of 1.5 that is peculiar to the second gear position is set as the first reference $C_1$, and a value that is substantially equal to the speed ratio of 1.0 that is peculiar to the third gear position is set as the second reference $C_2$. At a step 448, a decision is made whether the content of a memory register M that stores the lock-up control data T(n-1) obtained in the preceding run is equal to 1.

Since, in this example, T(n) was equal to 1 before the instant $t_1$, M is equal to 1, allowing the execution of a step 452 where an actual speed ratio r is obtained by a similar computation to that described in connection with the step 350 in FIG. 8.

At a step 453, a decision is made whether the speed ratio r is lower than or equal to the first reference $C_1$. Explaining here how the speed ratio varies after the instant $t_1$, the speed ratio r is kept at the speed ratio of 1.5 that is peculiar to the second gear position during the response delay $\Delta T_1$ and thus the relationship that r is greater than $C_1$ is maintained, so that the decision at the step 453 results in NO.

Since the flag F=01 is maintained until r becomes equal to or lower than $C_1$, a series of operations at steps 441, 442, 451, 452, 453 and 463 is repeated, and thus the lock-up is maintained.

Thereafter, at the instant $t_3$ after the response delay $\Delta T_1$, the actual shift operation in the automatic transmission 6 is initiated, causing the speed ratio r to decrease. Thus, immediately after the instant t3, the speed ratio r becomes below the first reference $C_1$, causing the decision at the step 453 to result in YES.

As a result, a step 454 is executed where the control signal $S_{LU}=0$ is set. This causes the lock-up solenoid 422 to be turned into OFF state, thus releasing the lock-up.

At the next step 455, a desicion is made whether the lock-up control data T(n) is equal to 1. If it is equal to 1, a step 456 is executed where the flag F=10 is set, whereas if it is equal to 0, a step 457 is executed where the flag F is reset as being equal to 00.

It is assumed, in this example, that the lock-up is needed even during operation at the third gear position and thus T(n)=1 is obtained at the computation at the step 441. Thus, under this condition, after the execution of the step 455, the flag F=10 is set at the step 456.

Thereafter, the steps 441, 442, 451, and 458 are executed, and then a step 459 is executed where a decision is made whether the speed ratio r has become equal to or lower than the second reference $C_2$. As long as the speed ratio r stays greater than $C_2$, the execution of the steps 441, 442, 451, 458, 459, and 463 is repeated, thus leaving the lock-up released.

When the speed ratio r become equal to or lower than $C_2$, at the instant t4 when the shift in the transmission 306 is completed, the decision at the step 459 turns out to be YES, thus allowing the execution of steps 460 and 461 where the state of the lock-up solenoid 422 is set in accordance with the lock-up control data T(n). Since, now, the data T(n) is equal to 1, the control signal $S_{LU}=1$ is set, allowing the resumption to the lock-up. If T(n) is equal to 0, the control signal $S_{LU}$ for the lock-up solenoid 22 is kept as being equal to the same state as the state 0 set at the step 454 in the preceding run, and the relationship T(n)=$S_{LU}$=0 is maintained, thus leaving the lock-up action released.

At a step 462, the flag F is reset as 00 which indicates the completion of the lock-up release during the shift.

Figure 25:
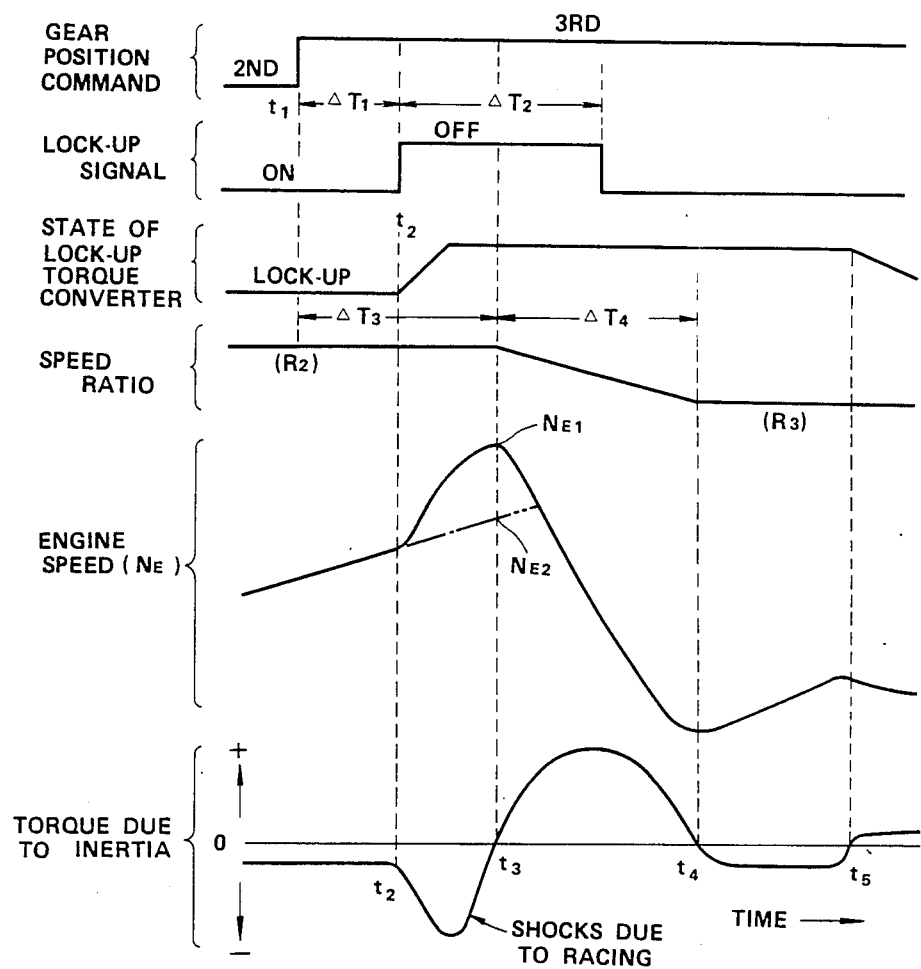
FIG. 25 is a timing diagram used in discussing the prior art.

As a result of the operations described above, the initiation timing of the lock-up release is is always brought into agreement with the instant t3 when the actual shift is initiated, thus preventing the occurrence of engine racing which was experienced in the conventional example as illustrated in FIG. 25.

Besides, since the instant t4 when the shift is completed is detected and the lock-up release is terminated at this instant, the resumption to the lock-up action after the completion of the shift operation can be effected rapidly without any delay.

Figure 23:
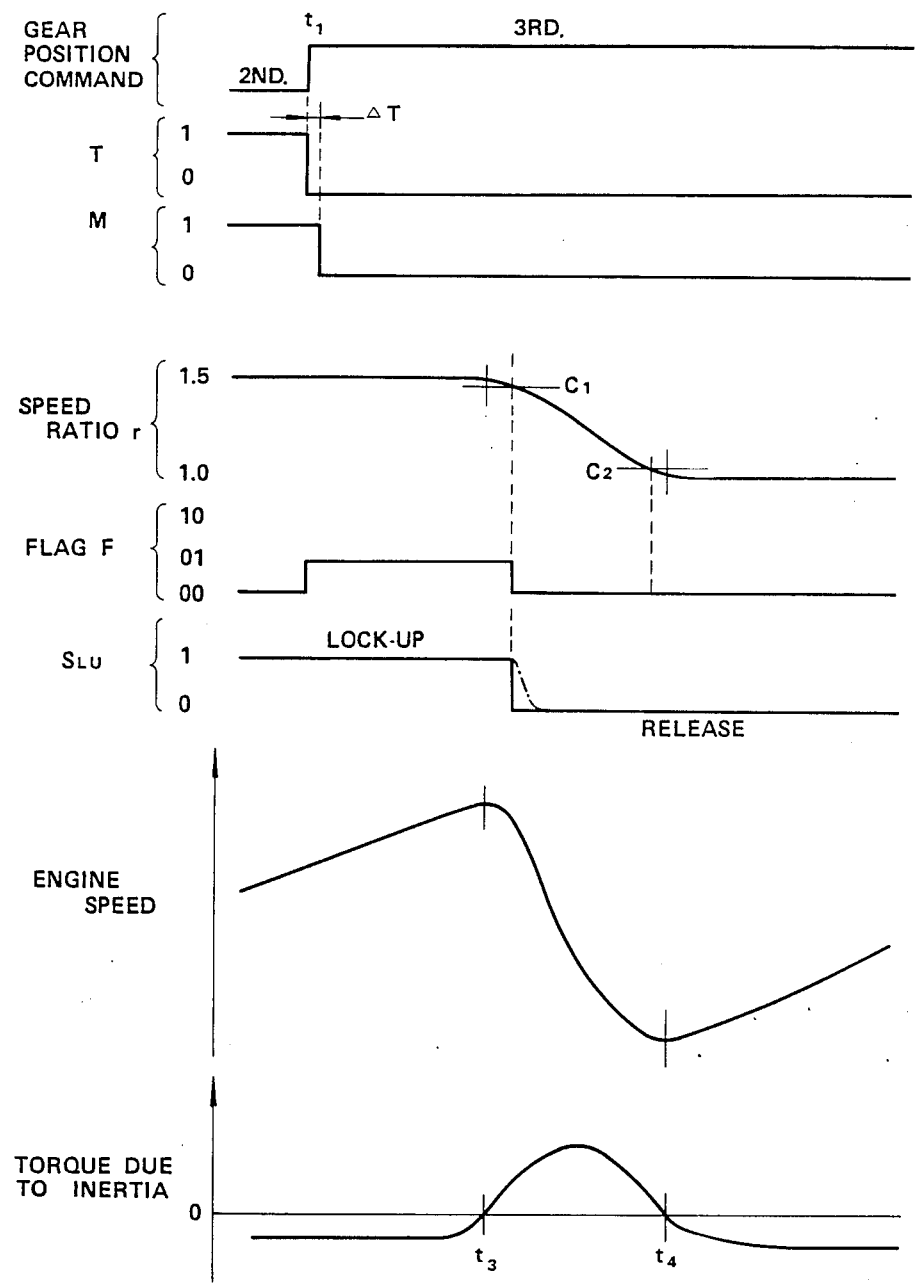
FIG. 23 is a timing diagram.

Although, in the above description, a case where there occurs a shift from the second gear position with the lock-up to the third gear position with the lock-up has been explained, there is described as to a shift from the second gear position with the lock-up to the third gear position with the converter state (lock-up release state) referring to FIG. 23.

Referring to FIG. 23, at the instant t1 when a change in gear position command occurs, T(n)=1 and M=1 hold, and thus the execution of steps 441, 442, 451 to 458, and 463 is repeated until the speed ratio r is below the first reference $C_1$, allowing the lock-up to continue. When the speed ratio r becomes equal to or less than $C_1$ (immediately after the instant t3), the decision at the step 453 turns out to be YES, and thus the steps 454 and 455 (where the decision results in NO because T(n)=0) are executed, and the step 457 is executed where the flag F=00 is set. Thus, the lock-up is released.

Subsequently, the steps 441 to 448 are executed. Since M=0 is recognized at the step 448, the step 449 is executed where the flag F=10 is set.

The lock-up release continues until the speed ratio r becomes equal to or lower than $C_2$. When r=$C_2$ is established (at the instant t4), the result of the decision at the step 459 turns out to be YES. Then, at the next step 460, a decision is made whether T(n) is equal to 1. Since, now, T(n)=0, the control signal $S_{LU}$ for the lock-up solenoid 22 is kept at 0, thus allowing the lock-up release to continue. This causes the vehicle to run with the converter state at the third gear position.

Figure 24:
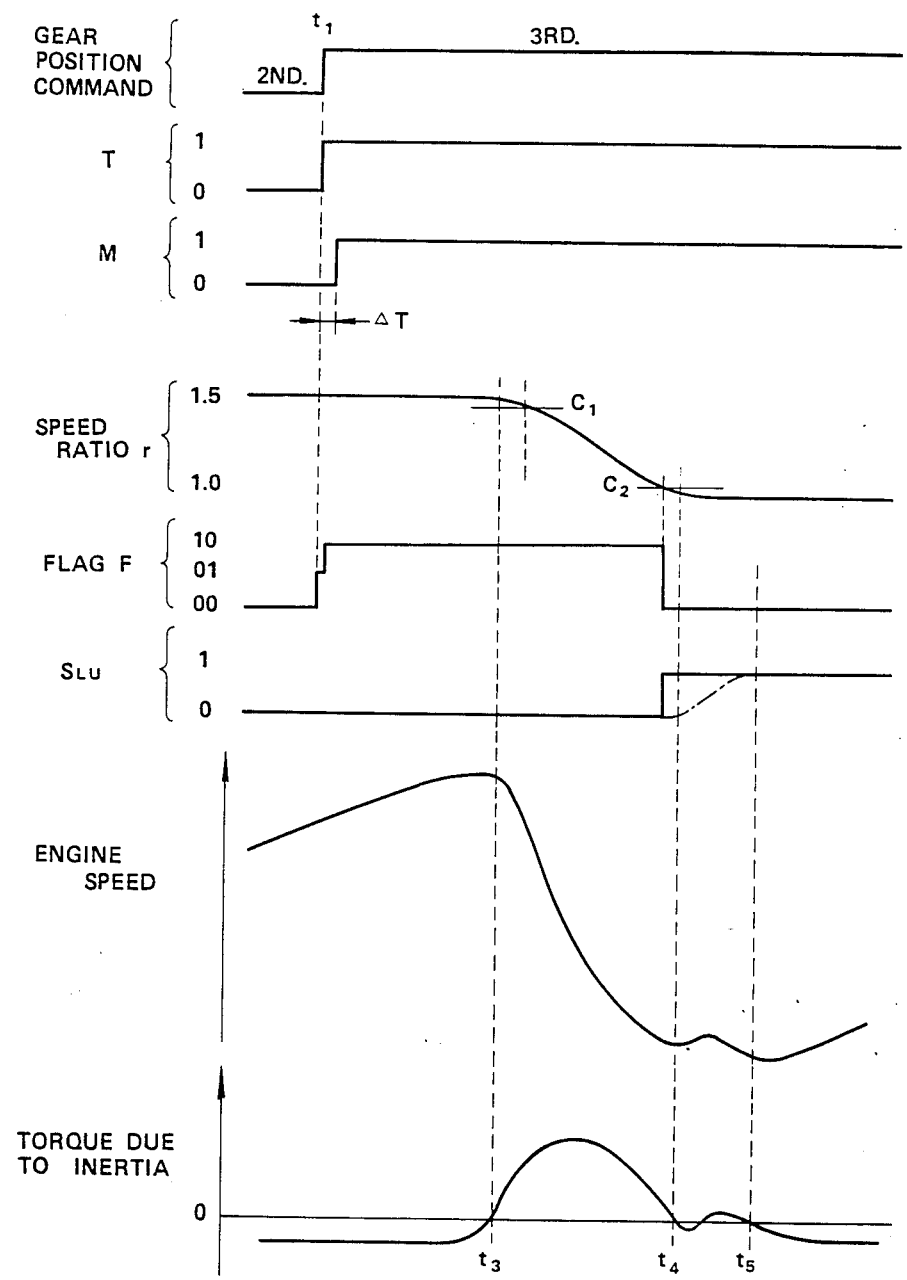
FIG. 24 is a timing diagram.

During a shift from the second gear position with the converter state to the third gear position with the lock-up, the control as illustrated in FIG. 24 is carried out.

Referring to FIG. 24, since T(n)=0 and M=0 hold at the instant t1, the flag F=10 is set at the step 449. In the next run (during the length of time ΔT after the instant t1), since the flag is equal to 10, after the execution of the steps 441, 442 and 451, steps 458 and 459 are executed where the operations that the speed ratio r is compared with the first reference $C_1$ is skipped and the speed ratio r is compared with the second reference $C_2$. This is because since this shift is from the converter state (lock-up release state) the second gear position, the lock-up release operation is unnecessary.

When the speed ratio r becomes lower that the second reference $C_2$, the flag F is reset as being equal to 00 and the control signal $S_{LU}$ is set as equal to T(n) that is equal to 1. This causes the vehicle to run with the lock-up state at the third gear position.

The transistion between the lock-up and the release of the lock-up is illustrated by one-dot chain line curve in each of FIGS. 22 to 24. However, this time required for this transision is very short and thus the shift operation is not affected.

Although, in the preceding description in connection with FIGS. 19 to 24, the invention has been described as being applied to an upshift, it is apparent that the invention may be equally applied to a downshift. What is necessary for applying the flow chart shown in FIG. 21 to the downshift is to modify the step 453 such that the speed ratio r is greater than or equal to $C_1$ and to modify the step 454 such that the speed ratio r is equal to or greater than $C_2$. Of course, it is possible to apply the invention to both upshift and downshift.

What is claimed is:

1. A device for controlling a motor vehicle installed with an engine and an automatic transmission during a shift in gear position in the automatic transmission, the automatic transmission having an input shaft drivingly connected to the engine and an output shaft, comprising:

means for detecting an actual value in a speed ratio of a revolution speed of the input shaft to that of the output shaft during a transient period involving a shift in gear position in the automatic transmission and generating an actual speed ratio indicative signal indicative of said actual value in said speed ratio; and means for effecting a closed loop control of said shift in gear position based on said actual speed ratio indicative signal during the transient period.

2. A device as claimed in claim 1, wherein said detecting means comprises:

first sensor means for generating a first pulse train signal having a frequency variable in proportion to a revolution speed of the input shaft;

second sensor means for generating a second pulse train signal having a frequency variable in proportion to a revolution speed of the output shaft;

means for finding a first period of said first pulse train signal and generating a first period indicative signal indicative of said first period found;

means for finding a second period of said second pulse train signal and generating a second period indicative signal indicative of said second period found; and means for calculating a ratio of said first period indicative signal to said second period indicative signal and generating said ratio as said actual speed ratio indicative signal.

3. A device as claimed in claim 2, wherein said closed loop control effecting means comprises:

means for setting a target value in said speed ratio which is desired to take place during said transient period and generating a target value indicative signal;

means for comparing said actual speed ratio indicative signal with said target value indicaive signal; and means responsive to the comparing result for hydraulically actuating the transmission to effect said shift in such a manner as to bring said actual speed ratio indicative signal into agreement with target value indicative signal.

4. A device as claimed in claim 3, wherein said hydraulically actuating means comprises:

a friction element to be actuated for effecting said shift;

a hydraulic pressure piston operatively coupled to said friction element for controlling actuation of said friction element;

pressure regulator valve means hydraulically connected to said hydraulic pressure piston for generating a regulated fluid pressure to be supplied to said hydraulic pressure piston in response to a bias fluid pressure applied thereto;

electromagnetic means for modifying the level of said bias fluid pressure in response to a duty ratio of an electric current passing therethrough; and means for setting said duty ratio in response to the comparing result of said actual speed ratio indicative signal with said reference indicative signal.

5. A device as claimed in claim 1, wherein said closed loop control effecting means comprises:

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value; and engine output controlling means for causing the engine to effect a temporal change during a length of time beginning with an instant when said actual speed indicative signal has attained said first predetermined relationship with said first reference value and ending with an instance when said actual speed ratio indicative signal has attained second predetermined relationship with said second reference value.

6. A device as claimed in claim 5, wherein said engine output controlling means comprises:

a spark timing controller for adjusting a spark timing within the engine in response to a signal supplied thereto; and means for temporarily correcing said signal to be supplied to said spark timing controller such that the engine effects said temporal change in engine output.

7. A device as claimed in claim 5, wherein said engine output controlling means comprises:

a throttle valve variable in opening degree to adjust load imposed on the engine in response to a signal supplied thereto; and means for temporarily correcting said signal to be supplied to said throttle valve such that the engine effects said temporal change in engine output.

8. A device as claimed in claim 1, wherein said closed loop control effecting means comprises:

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value;

engine output controlling means for causing the engine to effect a temporal change during a length of time beginning with an instant when said actual speed indicative signal has attained said first predetermined relationship with said first reference value and ending with an instance when said actual speed ratio indicative signal has attained second predetermined relationship with said second reference value;

timer means for counting a time lapsed after the instant when said actual speed ratio indicative signal has attained said first predetermined relationship with said first reference value; and means for mandatory terminating said temporal change in engine output when said time counted exceeds a predetermined length of time.

9. A device as claimed in claim 1, wherein said engine output controlling means comprises:

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value; and lock-up controlling means for releasing a lock-up type torque converter that is in driving connection between the engine and the input shaft during a length of time beginning with an instant when said actual speed indicative signal has attained said first predetermined relationship with said first reference value and ending with an instance when said actual speed ratio indicative signal has attained second predetermined relationship with said second reference value.

10. A detector for detecting a speed ratio established in a transmission having an input shaft and an output shaft, comprising:

first sensor means for generating a first pulse train signal having a frequency variable in proportion to a revolution speed of the input shaft;

second sensor means for generating a second pulse train signal having a frequency variable in proportion to a revolution speed of the output shaft;

means for finding a first period of said first pulse train signal and generating a first period indicative signal indicative of said first period found;

means for finding a second period of said second pulse train signal and generating a second period indicative signal indicative of said second period found; and means for calculating a ratio of said first period indicative signal to said second period indicative signal and generating said ratio as a speed ratio established in the transmission.

11. A device for controlling an automatic transmission during a shift in gear position taking place in the automatic transmission, the automatic transmission having an input shaft and an output shaft, comprising:

first sensor means for generating a first pulse train signal having a frequency variable in proportion to a revolution speed of the input shaft;

second sensor means for generating a second pulse train signal having a frequency variable in proportion to a revolution speed of the output shaft;

means for finding a first period of said first pulse train signal and generating a first period indicative signal indicative of said first period found;

means for finding a second period of said second pulse train signal and generating a second period indicative signal indicative of said second period found;

means for calculating a ratio of said first period indicative signal to said second period indicative signal and generating an actual speed ratio indicative signal indicative of said ratio;

means for setting a target value in said speed ratio which is desired to take place during said transient period and generating a target value indicative signal;

means for comparing said actual speed ratio indicative signal with said target value indicaive signal; and means responsive to the comparing result for hydraulically actuating the transmission to effect said shift in such a manner as to bring said actual speed ratio indicative signal into agreement with target value indicative signal.

12. A device for controlling a motor vehicle installed with an engine and an automatic transmission during a shift in gear position in the automatic transmission, the automatic transmission having an input shaft drivingly connected to the engine and an output shaft, comprising:

means for detecting an actual value in a speed ratio of a revolution speed of the input shaft to that of the output shaft during a transient period involving a shift in gear position in the automatic transmission and generating an actual speed ratio indicative signal indicative of said actual value in said speed ratio;

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value; and engine output controlling means for causing the engine to effect a temporal change during a length of time beginning with an instant when said actual speed indicative signal has attained said first predetermined relationship with said first reference value and ending with an instance when said actual speed ratio indicative signal has attained second predetermined relationship with said second reference value.

13. A device for controlling a motor vehicle installed with an engine and an automatic transmission during a shift in gear position in the automatic transmission, the automatic transmission having an input shaft drivingly connected to the engine and an output shaft, comprising:

means for detecting an actual value in a speed ratio of a revolution speed of the input shaft to that of the output shaft during a transient period involving a shift in gear position in the automatic transmission and generating an actual speed ratio indicative signal indicative of said actual value in said speed ratio;

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value;

engine output controlling means for causing the engine to effect a temporal change during a length of time beginning with an instant when said actual speed indicative signal has attained said first predetermined relationship with said first reference value and ending with an instance when said actual speed ratio indicative signal has attained second predetermined relationship with said second reference value; timer means for counting a time lapsed after the instant when said actual speed ratio indicative signal has attained said first predetermined relationship with said first reference value; and means for mandatory terminating said temporal change in engine output when said time counted exceeds a predetermined length of time.

14. A device for controlling a motor vehicle installed with an engine and an automatic transmission during a shift in gear position in the automatic transmission, the automatic transmission having an input shaft drivingly connected to the engine and an output shaft, comprising:

means for detecting an actual value in a speed ratio of a revolution speed of the input shaft to that of the output shaft during a transient period involving a shift in gear position in the automatic transmission and generating an actual speed ratio indicative signal indicative of said actual value in said speed ratio;

means for detecting a change in command for a gear position taking place in the automatic transmission;

means for determining the content of said change in command;

means for setting a first reference value and a second reference value which are predetermined for the content of said change in command;

means for determining whether said actual speed ratio indicative signal generated after said change in command has been detected has a first predetermined relationship with said first reference value;

means for determining whether said actual speed ratio indicative signal generated after said change in command has been detected has a second predetermined relationship with said second reference value; and lock-up controlling means for releasing a lock-up type torque converter that is in driving connection between the engine and the input shaft during a length of time beginning with an instant when said actual speed indicative signal has attained said first predetermined relationship with said first reference value and ending with an instance when said actual speed ratio indicative signal has attained second predetermined relationship with said second reference value.

* * * * *